(12) United States Patent
Suzuki

(10) Patent No.: US 12,162,332 B2
(45) Date of Patent: Dec. 10, 2024

(54) FRAME STRUCTURE OF AUTOMOTIVE EXTERIOR PANEL

(71) Applicant: NIPPON STEEL CORPORATION, Tokyo (JP)

(72) Inventor: Toshiya Suzuki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 144 days.

(21) Appl. No.: 17/799,593

(22) PCT Filed: Mar. 10, 2021

(86) PCT No.: PCT/JP2021/009518
§ 371 (c)(1),
(2) Date: Aug. 12, 2022

(87) PCT Pub. No.: WO2021/193065
PCT Pub. Date: Sep. 30, 2021

(65) Prior Publication Data
US 2023/0066661 A1 Mar. 2, 2023

(30) Foreign Application Priority Data

Mar. 24, 2020 (JP) .................................. 2020-053280
Mar. 24, 2020 (JP) .................................. 2020-053293

(51) Int. Cl.
*B60J 5/04* (2006.01)
(52) U.S. Cl.
CPC .................................. *B60J 5/0455* (2013.01)
(58) Field of Classification Search
CPC ...... B60J 5/0455; B60J 5/0458; B60J 5/0441; B60J 5/0444; B60J 5/0447; B60J 5/0043;
(Continued)

(56) References Cited

U.S. PATENT DOCUMENTS 5,795,013 A * 8/1998 Keller ..................... B60R 21/04
296/187.05
9,500,250 B2 * 11/2016 Tamada .................. F16F 7/121
(Continued)

FOREIGN PATENT DOCUMENTS

| JP | 2003-205741 A | 7/2003 |
| KR | 1998-037044 U | 9/1998 |
| WO | WO 2019/146789 A1 | 8/2019 |

*Primary Examiner* — Amy R Weisberg
*Assistant Examiner* — Veronica M Shull
(74) *Attorney, Agent, or Firm* — Birch, Stewart, Kolasch & Birch, LLP

(57) ABSTRACT

A frame structure of an automotive exterior panel includes a sheet-like outer panel, a plurality of first members, each of which has an elongated shape, and which are disposed on a vehicle inside with respect to the outer panel, and a second member that has an elongated shape and intersects with the plurality of first members, in which each of the plurality of first members extends in a first direction along a sheet surface of the outer panel, and has a groove part recessed from the vehicle outside toward the vehicle inside at a portion thereof in a longitudinal direction, the second member extends in a second direction along the sheet surface of the outer panel, and has a thickness in a vehicle inside-outside direction, which is uniform at a portion closer to the center than at both end portions in the longitudinal direction, and at an intersection portion where each of the plurality of first members and the second members intersect with each other, the second member is in contact with the inside of the groove part provided in each of the plurality of first members.

24 Claims, 15 Drawing Sheets

(58) Field of Classification Search
CPC ...... B60J 5/0423; B60J 5/0437; B60J 5/0412; B60J 5/042; B60J 5/0422
USPC ...................................... 296/146.6
See application file for complete search history.

(56) References Cited

U.S. PATENT DOCUMENTS

| | | | |
|---|---|---|---|
| 10,994,591 B2* | 5/2021 | Suzuki | B60J 5/0441 |
| 11,135,902 B2* | 10/2021 | Suzuki | B60R 21/0428 |
| 11,173,771 B2* | 11/2021 | Suzuki | B62D 25/10 |
| 11,639,087 B2* | 5/2023 | Suzuki | B60J 5/0412 |
| | | | 296/146.6 |
| 11,673,455 B2* | 6/2023 | Suzuki | B60J 5/0444 |
| | | | 296/191 |
| 11,712,949 B2* | 8/2023 | Suzuki | B60J 5/0441 |
| | | | 296/187.12 |
| 2012/0056445 A1* | 3/2012 | Golovashchenko | B62D 25/16 |
| | | | 29/897.2 |
| 2021/0122216 A1 | 4/2021 | Suzuki et al. | |

* cited by examiner

FRAME STRUCTURE OF AUTOMOTIVE EXTERIOR PANEL

TECHNICAL FIELD OF THE INVENTION

The present invention relates to a frame structure of an automotive exterior panel.

This application claims the right of priority based on Japanese Patent Application No. 2020-053280 filed with the Japan Patent Office on Mar. 24, 2020, and Japanese Patent Application No. 2020-053293 filed with the Japan Patent Office on Mar. 24, 2020, the contents of which are incorporated herein by reference.

RELATED ART

As the related art, a technique assumed to provide a door structure for an automobile, in which it is possible to achieve vibration suppression with a high level and panel stiffness improvement of a door outer panel while suppressing a weight increase and a cost increase is known (refer to, for example, Patent Document 1).

In the technique disclosed in Patent Document 1 above, one strut extending in a vehicle height direction of the door and a door outer waist reinforcement and a guard bar extending in a vehicle length direction of the door are provided. Of these, the strut extending in the vehicle height direction of the door is provided to improve the panel stiffness of the panel, and the guard bar extending in the vehicle length direction is responsible for absorbing an impact due to a collision.

PRIOR ART DOCUMENT

Patent Document

[Patent Document 1] Japanese Unexamined Patent Application, First Publication No. 2003-205741

DISCLOSURE OF THE INVENTION

Problems to be Solved by the Invention

In the technique disclosed in Patent Document 1 above, since the strut provided by only one is provided for the panel stiffness improvement, it is not possible to perform impact absorption around the strut. Further, in order to absorb an impact, it is necessary to provide a strong guard bar, which causes a problem of increasing the weight of the door.

Therefore, it is conceivable to absorb an impact load and suppress a weight increase by disposing a plurality of members extending in different directions in a grid pattern and distributing the impact load to the plurality of members. In such a structure, a structure of an intersection portion is required in which the members intersect with each other while causing each of the members extending in different directions to have strength for absorbing the impact load.

On the other hand, in order for each member to evenly receive a load from the vehicle outside, it is preferable that each member is in proximity to the outer panel. In order to provide such a structure, it is conceivable to provide each of the members extending in different directions with a thickness-reduced portion having a reduced thickness such that the member can intersect with the intersecting member on the other side. Further, since a space in a thickness direction of an exterior panel is limited, it is also effective to provide the thickness-reduced portion in order to cause the members to intersect with each other in the limited space. However, in such a structure, there is a problem in that a manufacturing process becomes complicated in order to provide the thickness-reduced portion. In particular, in a case where each of the members is made to be a hollow member, it is necessary to devise a processing method such as press forming in order to provide the thickness-reduced portion, and thus there is a problem in that preparation man-hours and manufacturing man-hours or a manufacturing time for appropriately establishing a manufacturing process are required.

Further, if the thickness-reduced portion is provided, the strength of the member decreases at the position, and therefore, in a case where an impact load is applied, the member is bent at the position of the thickness-reduced portion, causing a problem in that the impact cannot be effectively absorbed.

Therefore, the present invention has an object to provide a frame structure of an automotive exterior panel in which it is possible to simplify a manufacturing process and reliably absorb an impact load, in a frame structure of an automotive exterior panel in which members configuring a frame intersect with each other.

Means for Solving the Problem

The gist of the present disclosure is as follows.

(1) A first aspect of the present invention is a frame structure of an automotive exterior panel including: a sheet-like outer panel; a plurality of first members, each of which has an elongated shape, and which are disposed on a vehicle inside with respect to the outer panel; and a second member that has an elongated shape and intersects with the plurality of first members, in which each of the plurality of first members extends in a first direction along a sheet surface of the outer panel, and has a groove part recessed from a vehicle outside toward the vehicle inside at a portion thereof in a longitudinal direction, the second member extends in a second direction along the sheet surface of the outer panel, and has a thickness in a vehicle inside-outside direction, which is uniform at a portion closer to a center than at both end portions in the longitudinal direction, and at an intersection portion where each of the plurality of first members and the second members intersect with each other, the second member is in contact with an inside of the groove part provided in each of the plurality of first members.

(2) In the frame structure of an automotive exterior panel according to the above (1), except for the intersection portion, a thickness of the first member may be larger than the thickness of the second member in the vehicle inside-outside direction.

(3) In the frame structure of an automotive exterior panel according to the above (2), except for the intersection portion, the thickness of the first member may be equal to or larger than twice the thickness of the second member in the vehicle inside-outside direction.

(4) In the frame structure of an automotive exterior panel according to any one of the above (1) to (3), the first member may be thicker than the second member.

(5) In the frame structure of an automotive exterior panel according to any one of the above (1) to (4), in the vehicle inside-outside direction, a depth of the groove part of the first member may be equal to or smaller than ½ of a thickness of the first member in a region adjacent to the groove part outside the groove part.

(6) In the frame structure of an automotive exterior panel according to any one of the above (1) to (5), at the intersection portion, surfaces of the first member and the second member on the vehicle outside in the vehicle inside-outside direction may form the same surface.

(7) In the frame structure of an automotive exterior panel according to any one of the above (1) to (6), in a cross section orthogonal to the longitudinal direction of the first member, a thickness in the vehicle inside-outside direction may be equal to or larger than a width in a direction along the sheet surface of the outer panel.

(8) In the frame structure of an automotive exterior panel according to any one of the above (1) to (7), in a cross section orthogonal to the longitudinal direction of the second member, a thickness in the vehicle inside-outside direction may be equal to or larger than a width in a direction along the sheet surface of the outer panel.

(9) In the frame structure of an automotive exterior panel according to any one of the above (1) to (8), at least one of the first member and the second member may have a quadrangular shape in a cross section orthogonal to the longitudinal direction, in at least a portion except for the intersection portion.

(10) In the frame structure of an automotive exterior panel according to the above (9), the second member may have a first surface adjacent to the outer panel and a second surface facing the first surface, and in a cross section orthogonal to the longitudinal direction of the second member, a length of a first side corresponding to the first surface may be shorter than a length of a second side corresponding to the second surface.

(11) In the frame structure of an automotive exterior panel according to any one of the above (1) to (10), at least one of the first member and the second member may have an annular shape in a cross section orthogonal to the longitudinal direction, in at least a portion except for the intersection portion.

(12) In the frame structure of an automotive exterior panel according to any one of the above (9) to (11), the first member may have a hollow structure in which a sheet material is bent, and have a first surface adjacent to the outer panel and a second surface facing the first surface, and on the second surface of the first member, end edges of the bent sheet material may be adjacent to each other and face each other.

(13) In the frame structure of an automotive exterior panel according to the above (12), on the second surface of the first member, the end edges that face each other are curved in different shapes, and an end edge intersection portion in which the curved end edges intersect with each other when viewed from a facing direction in which the end edges face each other may be provided.

(14) In the frame structure of an automotive exterior panel according to any one of the above (9) to (13), the second member may have a hollow structure in which a sheet material is bent, and have a first surface adjacent to the outer panel and a second surface facing the first surface, and on the first surface or the second surface of the second member, end edges of the bent sheet material may be adjacent to each other and face each other.

(15) In the frame structure of an automotive exterior panel according to the above (14), on the first surface of the second member, the end edges of the bent sheet material may be adjacent to each other and face each other.

(16) In the frame structure of an automotive exterior panel according to the above (15), at the intersection portion or in the vicinity of the intersection portion, on the first surface of the second member, the end edges that face each other may be curved in different shapes, and an end edge intersection portion in which the curved end edges intersect with each other when viewed from a facing direction in which the end edges face each other may be provided.

(17) In the frame structure of an automotive exterior panel according to the above (14), at the intersection portion or in the vicinity of the intersection portion, on the first surface or the second surface of the second member, the end edges that face each other may be curved in different shapes, and an end edge intersection portion in which the curved end edges intersect with each other when viewed from a facing direction in which the end edges face each other may be provided.

(18) In the frame structure of an automotive exterior panel according to the above (17), on the second surface of the second member, the end edges of the bent sheet material may be adjacent to each other and face each other.

(19) In the frame structure of an automotive exterior panel according to any one of the above (1) to (18), the first direction may be a vehicle height direction, and the second direction may be a vehicle length direction.

(20) In the frame structure of an automotive exterior panel according to any one of the above (1) to (19), the outer panel may be an outer panel in a door of an automobile.

(21) In the frame structure of an automotive exterior panel according to any one of the above (12) to (18), the groove part may be configured as an opening portion of the sheet material.

(22) In the frame structure of an automotive exterior panel according to any one of the above (1) to (21), the groove part of the first member may be a thickness-reduced portion having a thickness reduced with respect to a thickness of a portion, which is not the groove part, of the first member.

(23) In the frame structure of an automotive exterior panel according to any one of the above (1) to (22), the second member may be fitted into the groove part at the intersection portion.

(24) In the frame structure of an automotive exterior panel according to the above (23), at the intersection portion, in a cross section orthogonal to the longitudinal direction of the second member, a cross-sectional shape of the second member may be the same shape as a shape of the groove part of the first member.

Effects of the Invention

According to the present invention, in a frame structure of an automotive exterior panel in which members configuring a frame intersect with each other, the effect capable of simplifying a manufacturing process and reliably absorbing an impact load is exhibited.

EMBODIMENTS OF THE INVENTION

Figure 1:
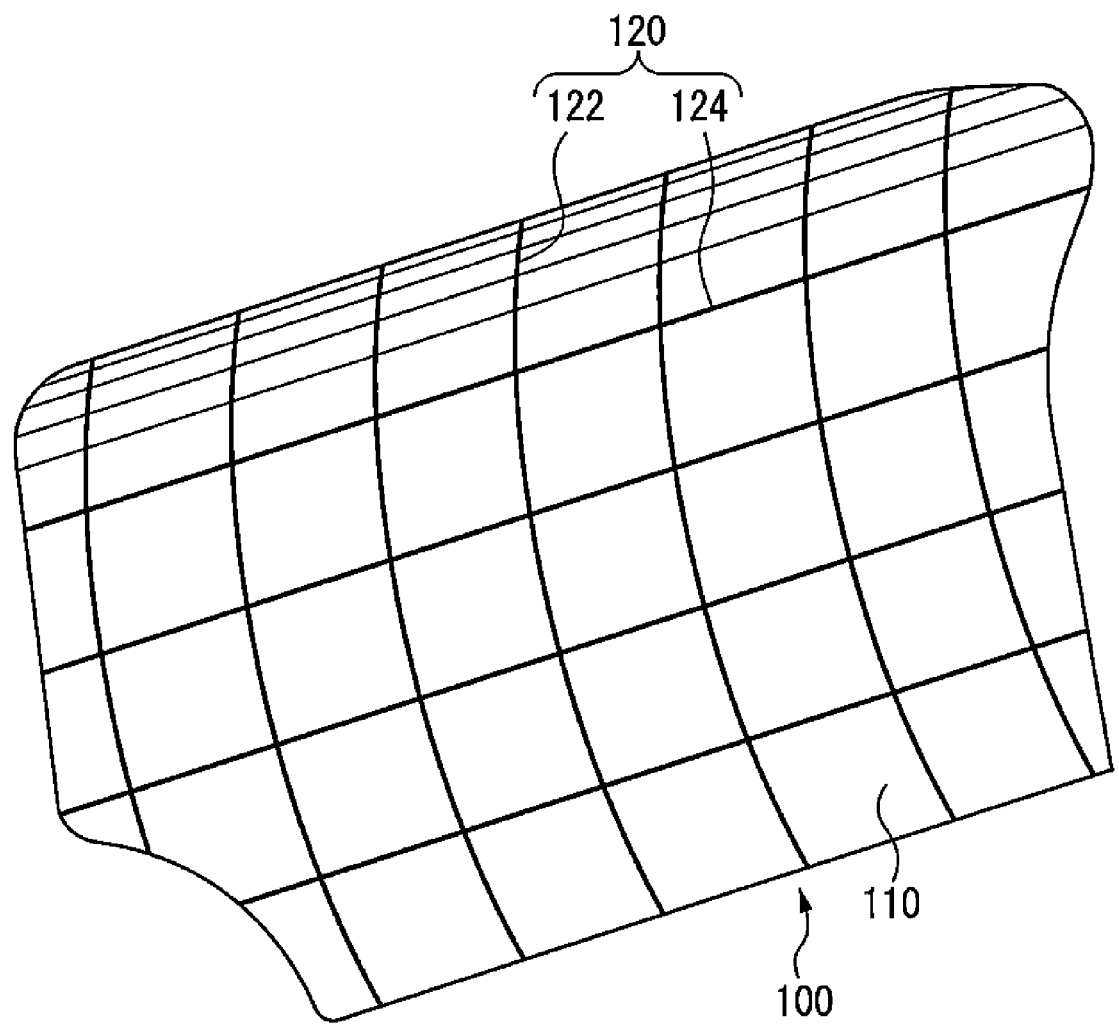
FIG. 1 is a schematic diagram showing a state where the inside of an exterior panel of an automobile according to an embodiment is viewed from the back side (the vehicle inside of the automobile).

First, the configuration of an exterior panel of an automobile according to an embodiment of the present invention will be described with reference to FIG. 1. FIG. 1 is a schematic diagram showing a state where the inside of an exterior panel 100 of an automobile according to the present embodiment is viewed from the back side (the vehicle inside of the automobile). Here, a door panel is shown as the exterior panel 100. However, the exterior panel 100 may be a panel of another portion of an automobile, such as a fender, a bonnet, a roof, or a rear gate.

As shown in FIG. 1, the exterior panel 100 has an outer panel (an exterior material) 110 and a reinforcing member 120. The outer panel 110 is made of a steel sheet having a thickness of about 0.4 mm as an example. The outer panel 110 is curved along an up-down direction such that the front side (the vehicle outside of the automobile) has a convex surface.

The reinforcing member 120 includes a first reinforcing member 122 having an elongated shape and disposed in the up-down direction and a second reinforcing member 124 having an elongated shape and disposed in the horizontal direction. The elongated shape means a shape having a length extending in a predetermined direction. It is desirable that the first reinforcing member 122 is curved to follow the curvature of the outer panel 110. The second reinforcing member 124 extends substantially linearly. However, in a case where the outer panel 110 is curved, it is desirable that the second reinforcing member 124 has a shape that follows the curvature. This is because, if the first reinforcing member 122 and the second reinforcing member 124 have the shapes that follow the outer panel 110, the first reinforcing member 122 and the second reinforcing member 124 can be in close contact with the outer panel 110 and preferably can be joined (bonded) to the outer panel 110. If the first reinforcing member 122 or the second reinforcing member 124 is joined to the outer panel 110, when the first reinforcing member 122 or the second reinforcing member 124 is deformed, the outer panel 110 resists the deformation. That is, the outer panel 110 can contribute to impact absorption.

Figure 2:
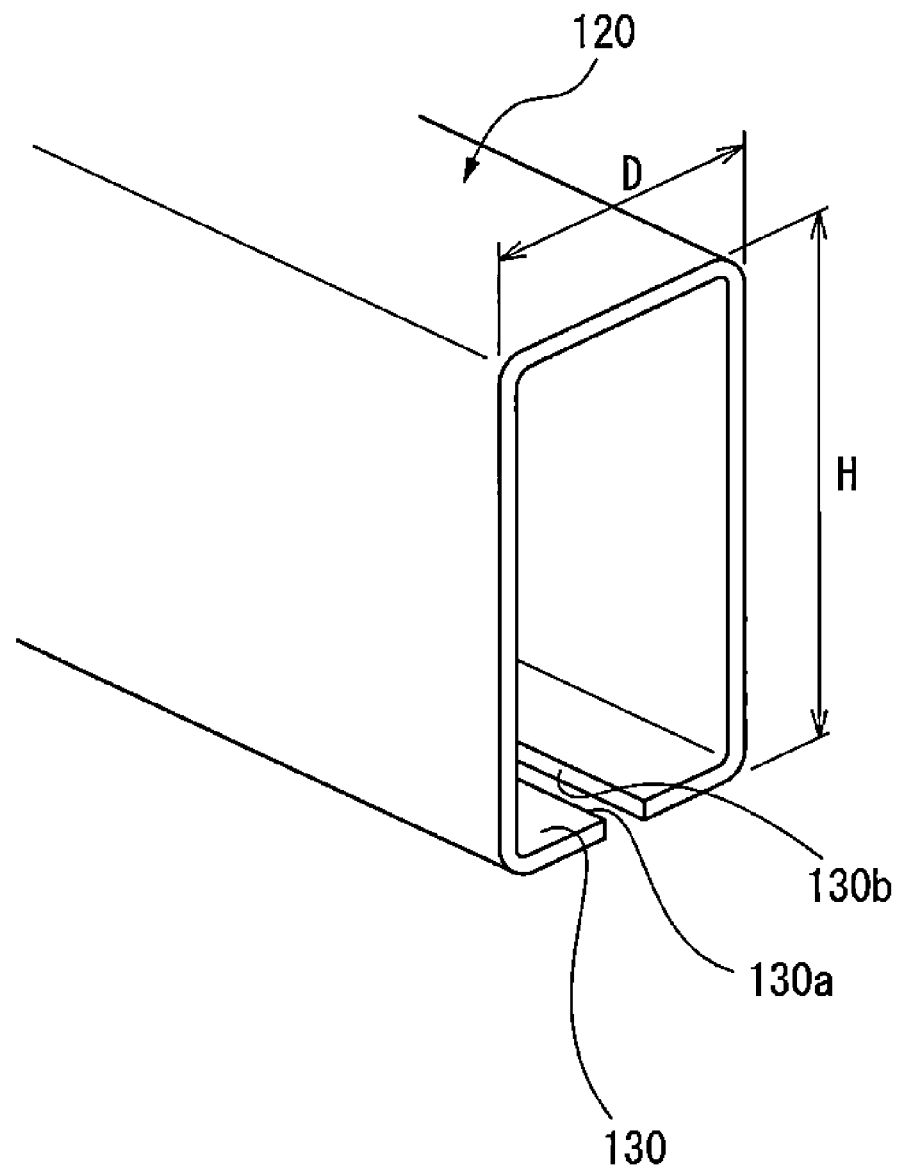
FIG. 2 is a perspective view showing a configuration of a reinforcing member.

FIG. 2 is a perspective view showing the configuration of the reinforcing member 120. The basic configurations of the first reinforcing member 122 and the second reinforcing member 124 can be the same. However, as will be described later, one of the first reinforcing member 122 and the second reinforcing member 124 is made to have higher rigidity than the other. As an example, the reinforcing member 120 has a hollow rectangular cross section. The reinforcing member 120 is manufactured by bending a sheet material 130. Further, the reinforcing member 120 may be manufactured with a hollow annular member or a solid rod-like member. As for the cross-sectional shape of the reinforcing member 120, in addition to the rectangle, various shapes such as a hexagon, a quadrangle, a triangle, a circle, and an ellipse can be adopted. In the example shown in FIG. 2, the reinforcing member 120 has a rectangular cross-sectional shape, and the side thereof includes a long side of about 16 mm and a short side of about 10 mm. Further, the sheet thickness of the sheet material 130 configuring the reinforcing member 120 is about 0.8 mm as an example. As the sheet material 130, a steel sheet can be used.

As shown in FIG. 2, a predetermined gap may be provided between an end portion (an end edge) 130a and an end portion 130b of the bent sheet material 130. On the other hand, the end portion 130a and the end portion 130b may be in close contact with each other. Further, the end portion 130a and the end portion 130b may be joined to each other by welding, bonding or the like. The reinforcing member 120 is disposed such that the surface where the end portions 130a and 130b are located or the surface on the opposite side, which faces the surface where the end portions 130a and 130b are located, is in close contact with the outer panel 110. Preferably, the surface where the end portions 130a and 130b are located or the surface on the opposite side, which faces the surface where the end portions 130a and 130b are located, is joined to the outer panel 110. The shape of the cross section orthogonal to a longitudinal direction of the first reinforcing member 122 or the second reinforcing member 124 may be an annular shape. In that case, the configuration in which the shape of the cross section is an annular shape includes a configuration in which a gap is provided between the end portion 130a and the end portion 130b, as shown in FIG. 2.

Here, the surface that is joined to or adjacent to the outer panel 110, among the surfaces of the reinforcing member 120, is referred to as a bottom surface (a first surface). Further, the surface facing the bottom surface (the surface located on the side opposite to the bottom surface) is referred to as a top surface (a second surface). The surface that is located on each of both sides of the bottom surface with a ridge interposed therebetween is referred to as a vertical wall. In a case where the cross-sectional shape of the reinforcing member 120 is a rectangular shape, a short side is the bottom surface or the top surface, and a long side is the vertical wall. Even in a case where the reinforcing member 120 is composed of a solid member, the surface facing the bottom surface (the surface located on the side opposite to the bottom surface) is referred to as a top surface. In a configuration in which the end portions 130a and 130b are disposed on the top surface without being joined thereto, when the reinforcing member 120 is curved by being pushed from an outside direction of the exterior panel 100, there is a case where the cross section is opened from the end portions 130a and 130b and the cross-sectional shape collapses. However, if the end portions 130a and 130b are joined, since the cross-sectional shape can be prevented from collapsing, it becomes possible to further increase the stiffness of the exterior panel 100. Even in a case where the end portions 130a and 130b are disposed on the bottom surface and the bottom surface is joined to the outer panel 110, it is possible to prevent the end portions 130a and 130b from being separated from each other and the cross-sectional shape from collapsing.

As shown in FIG. 2, when in the cross section orthogonal to the longitudinal direction of the reinforcing member 120, the short side of the rectangle is defined as a "width (D)" and the long side is defined as a "thickness (height) (H)", the thickness H in the direction orthogonal to the surface of the outer panel 110, of the reinforcing member 120, is larger than the width D in the direction along the outer panel 110. In this way, in a case where a collision load from the vehicle body outside to the vehicle body inside of the exterior panel 100 is applied, it is possible to effectively improve the second moment of area of the reinforcing member 120. Then, since the second moment of area of the reinforcing member 120 is improved, so that the bending rigidity of the reinforcing member 120 can be improved, the exterior panel 100 according to the present embodiment can improve collision resistance performance.

The cross-sectional structure of the reinforcing member 120 is not limited to the configuration in which the end portions 130a and 130b face each other as shown in FIG. 2, and may be, for example, a groove type (channel) shape or a hat shape in which the end portions 130a and 130b are separated from each other. Further, also with respect to the material of the reinforcing member 120, in addition to steel, other metal materials such as aluminum may be used, or a resin material or the like may be used.

Figure 3:
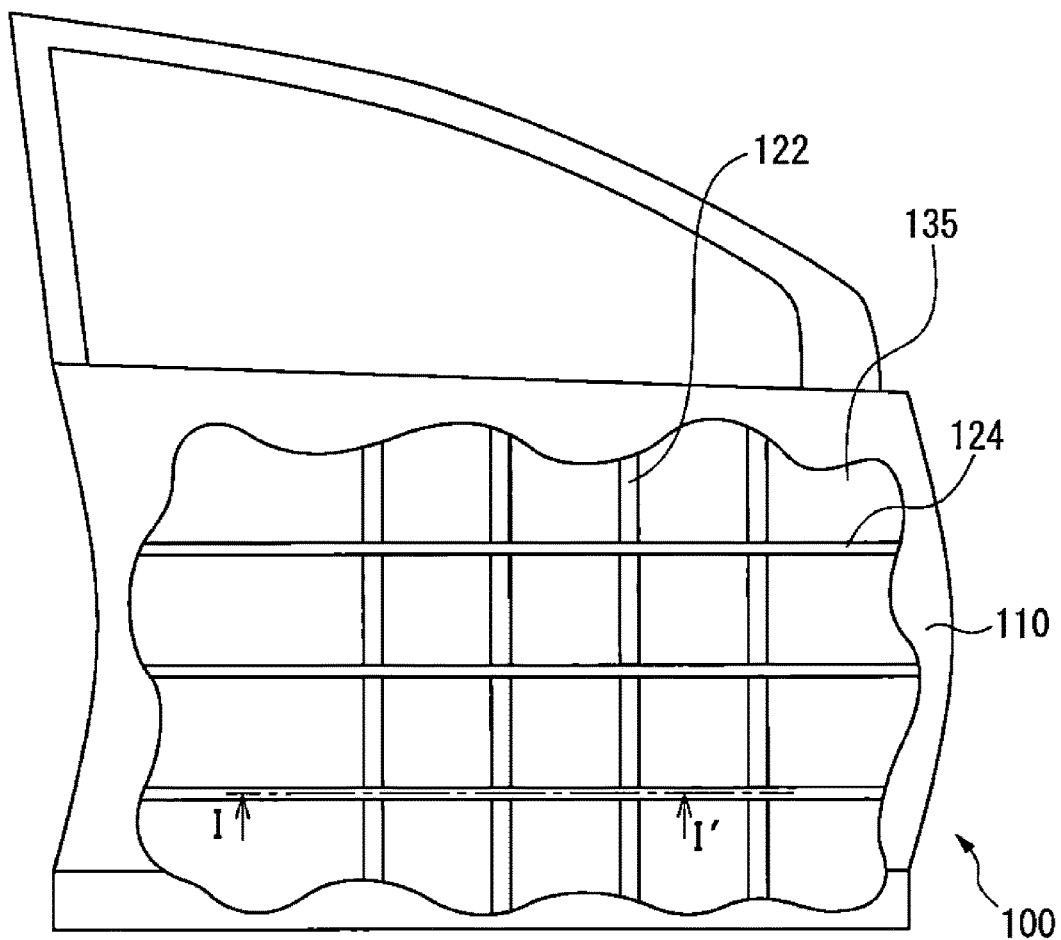
FIG. 3 is a schematic diagram showing a state where the exterior panel is viewed from the front side.

FIG. 3 is a schematic diagram showing a state where the exterior panel 100 is viewed from the front side. For the sake of description, in FIG. 3, the internal structure of the exterior panel 100 is shown by breaking the outer panel 110. The exterior panel 100 has an inner panel 135 in addition to the outer panel 110 and the reinforcing member 120.

Figure 4:
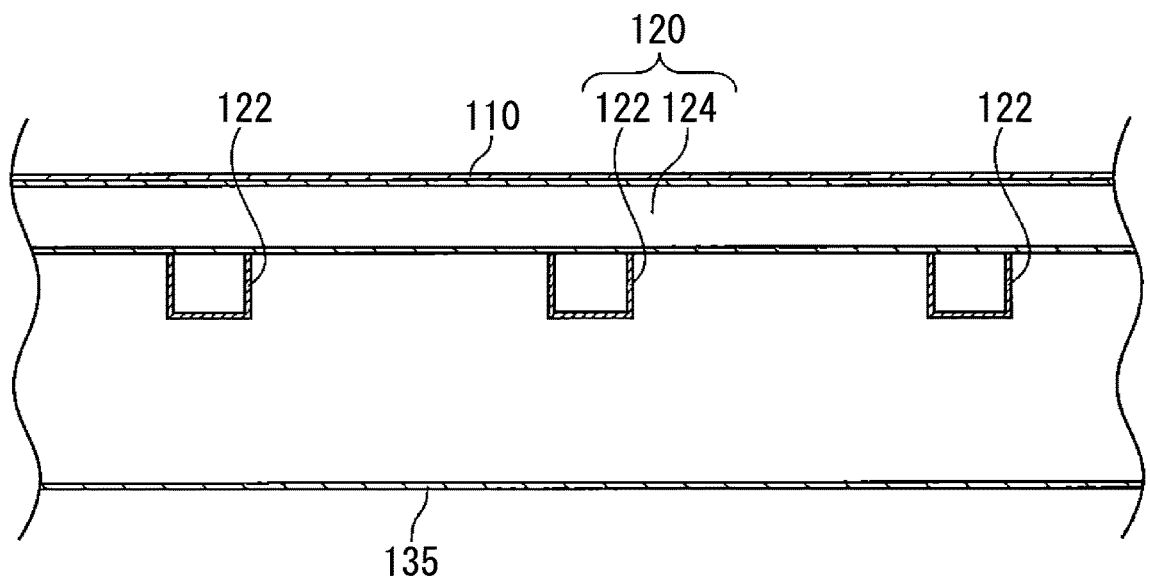
FIG. 4 is a schematic diagram showing a cross section taken along a dashed-dotted line I-I' in FIG. 3.

FIG. 4 is a schematic diagram showing a cross section along a dashed-dotted line I-I' in FIG. 3, and shows a cross section at the position of an intersection portion where the first reinforcing member 122 and the second reinforcing member 124 intersect with each other. As shown in FIG. 4, the outer panel 110, the reinforcing member 120, and the inner panel 135 are disposed in this order from the front side of the exterior panel 100. As shown in FIG. 4, at the position of the intersection portion, the second reinforcing member 124 is located on the vehicle outside (the outer panel 110 side) with respect to the first reinforcing member 122. Interior components (not shown) of an automobile are disposed further inside the inner panel 135. The end portions in the longitudinal direction of the first reinforcing member 122 and the second reinforcing member 124 are fixed to the inner panel 135 between the outer panel 110 and the inner panel 135.

Figure 5:
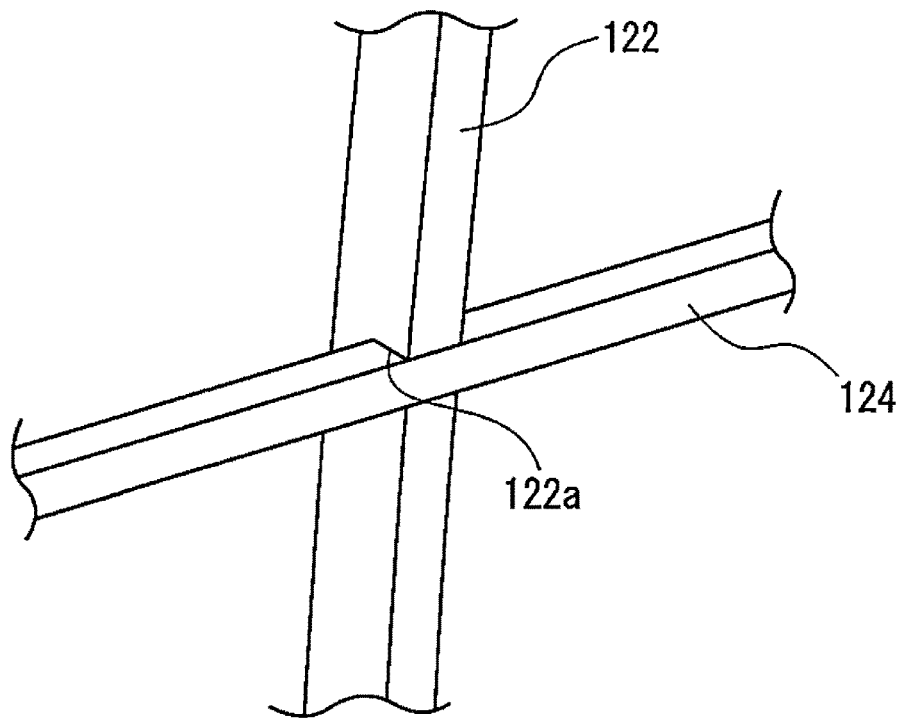
FIG. 5 is a perspective view showing a state where an intersection portion of a first reinforcing member and a second reinforcing member in FIG. 3 is viewed from the vehicle outside.
Figure 6:
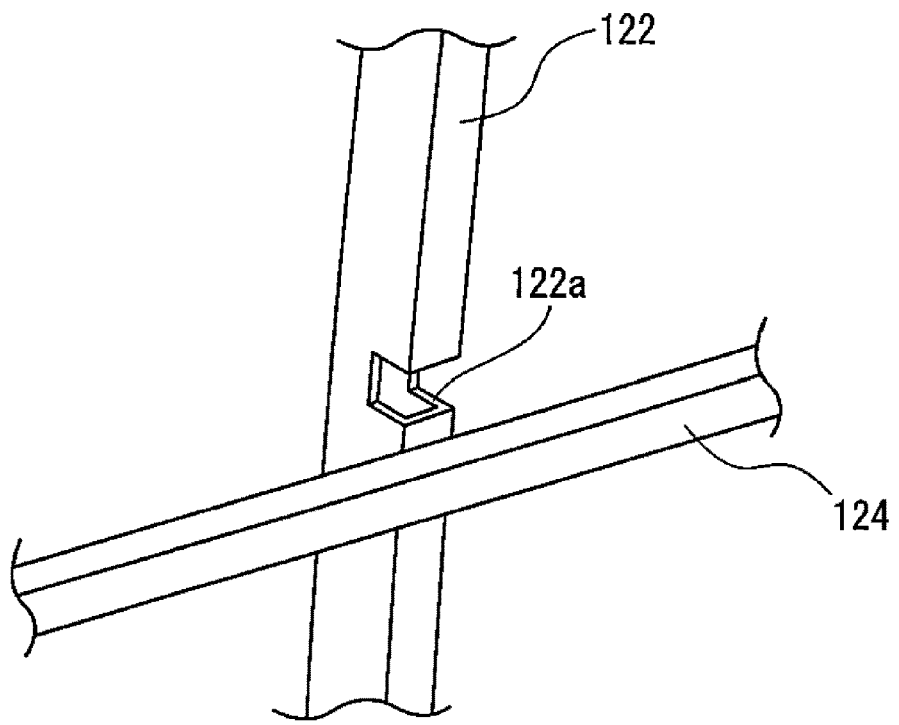
FIG. 6 is a schematic diagram showing a state where the first reinforcing member and the second reinforcing member are separated from each other at the intersection portion shown in FIG. 5.

FIG. 5 is a perspective view showing a state where the intersection portion of the first reinforcing member 122 and the second reinforcing member 124 in FIG. 3 is viewed from the vehicle outside. Further, FIG. 6 is a schematic diagram showing a state where the first reinforcing member 122 and the second reinforcing member 124 are separated from each other at the intersection portion shown in FIG. 5. As described above, at the position of the intersection portion, the second reinforcing member 124 is located on the vehicle outside with respect to the first reinforcing member 122. As shown in FIG. 6, a groove part 122a recessed from the vehicle outside toward the vehicle inside (that is, a thickness-reduced portion which is a portion having a thickness reduced with respect to the thickness of a portion other than the groove part 122a in the first reinforcing member 122) is provided in the first reinforcing member 122. The second reinforcing member 124 is inserted into the groove part 122a. When the second reinforcing member 124 is inserted into the groove part 122a at the intersection portion, the surfaces on the vehicle outside of the first reinforcing member 122 and the second reinforcing member 124 become substantially the same surface. Therefore, the surfaces on the vehicle outside of the first reinforcing member 122 and the second reinforcing member 124 can be joined to the surface on the back side of the outer panel 110 or can be brought close to the surface on the back side of the outer panel 110.

As shown in FIG. 6, the groove part 122a provided in the first reinforcing member 122 is formed by providing an opening portion in the sheet material 130 configuring the first reinforcing member 122. The groove part 122a is formed by forming an opening in the sheet material 130 before the sheet material 130 is bent to form the first reinforcing member 122. Further, the groove part 122a may be formed by processing the first reinforcing member 122 after the sheet material 130 is bent to form the first reinforcing member 122.

Figure 7:
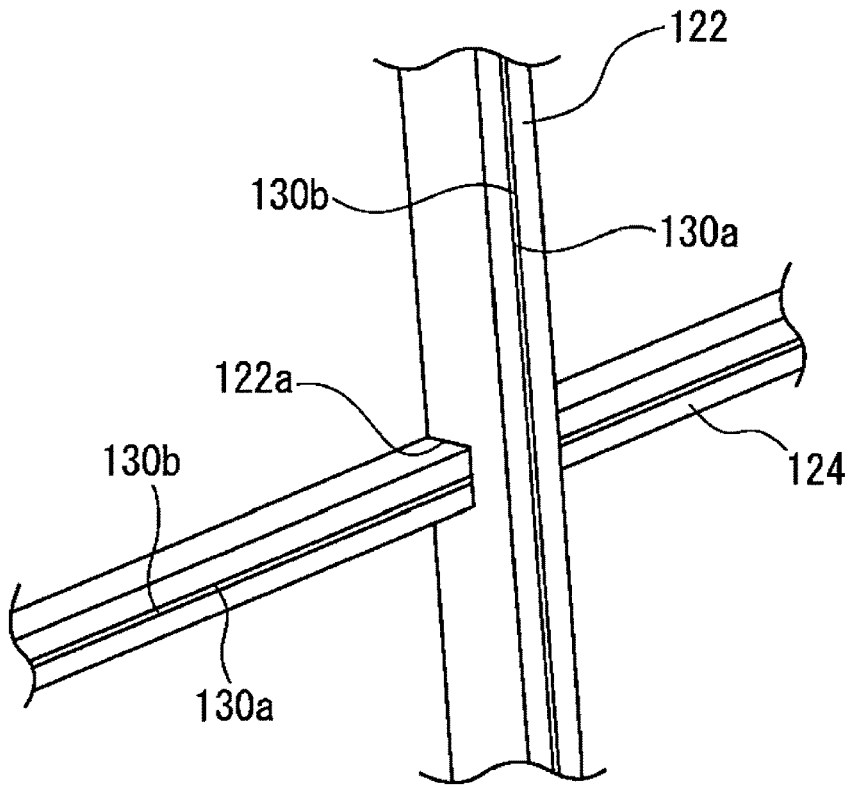
FIG. 7 is a perspective view showing a state where the intersection portion shown in FIG. 5 is viewed from the vehicle inside.
Figure 8:
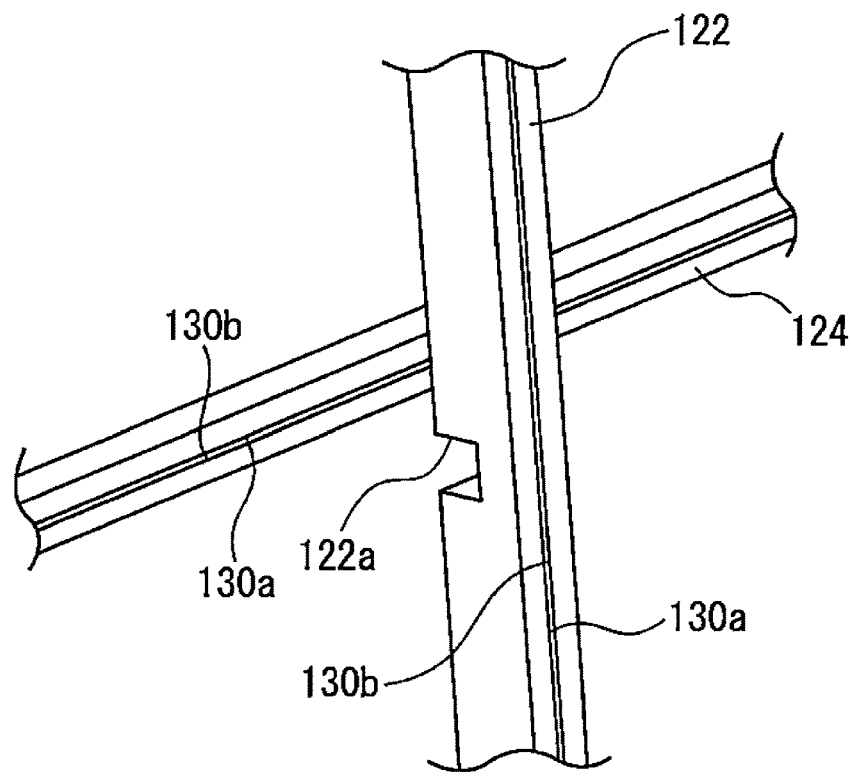
FIG. 8 is a perspective view showing a state where the first reinforcing member and the second reinforcing member shown in FIG. 6 are separated from each other, as viewed from the vehicle inside.

FIG. 7 is a perspective view showing a state where the intersection portion shown in FIG. 5 is viewed from the vehicle inside. Further, FIG. 8 is a perspective view showing a state where the first reinforcing member 122 and the second reinforcing member 124 shown in FIG. 6 are separated from each other, as viewed from the vehicle inside. In this example, both of the end portions 130a and 130b of the sheet material 130 configuring the first reinforcing member 122 and the end portions 130a and 130b of the sheet material 130 configuring the second reinforcing member 124 are located on the vehicle inside.

As described above, in the present embodiment, at the intersection portion where the first reinforcing member 122 and the second reinforcing member 124 intersect with each other, the groove part 122a is provided only in the first reinforcing member 122 by providing an opening portion in the sheet material 130 configuring the first reinforcing member 122. In this way, the first reinforcing member 122 and the second reinforcing member 124 can be intersected while being appropriately restrained or in contact with each other with a simple configuration. Therefore, when the first reinforcing member 122 and the second reinforcing member 124 are intersected while being restrained or in contact with each other, the manufacturing process of these reinforcing members is simplified, and the manufacturing preparation man-hours or manufacturing costs are reduced.

Then, since the surfaces on the vehicle outside of the first reinforcing member 122 and the second reinforcing member 124 become substantially the same surface by inserting the second reinforcing member 124 into the groove part 122a, the first reinforcing member 122 and the second reinforcing member 124 can be disposed adjacent to the rear surface of the outer panel 110. Therefore, in a case where an impact load is applied from the outside of the exterior panel 100, the impact load is dispersed and absorbed in a plane direction along the reinforcing member 120. Further, since the first reinforcing member 122 and the second reinforcing member 124 can be disposed adjacent to the rear surface of the outer panel 110, the effect of improving panel stiffness can also be obtained.

Figure 9:
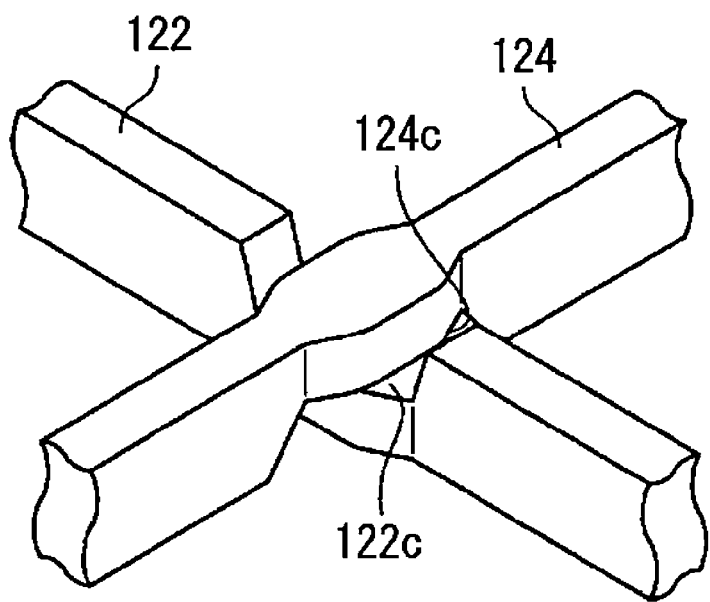
FIG. 9 is a perspective view showing the intersection portion of the first reinforcing member and the second reinforcing member and is a schematic diagram showing, as a related technique, for comparison, a case where a recessed part is formed in the first reinforcing member by press forming and a recessed part is formed in the second reinforcing member by press forming.

Here, it is also conceivable that recessed parts (the thickness-reduced portions described above) are formed in both the first reinforcing member 122 and the second reinforcing member 124 at the intersection portion of the first reinforcing member 122 and the second reinforcing member 124 and the first reinforcing member 122 and the second reinforcing member 124 are intersected. Even in this case, a structure can be made in which the surfaces on the vehicle outside of the first reinforcing member 122 and the second reinforcing member 124 become substantially the same surface. FIG. 9 is a perspective view showing the intersection portion of the first reinforcing member 122 and the second reinforcing member 124, and shows, as a related technique, for comparison, a case where a recessed part 122c is provided in the first reinforcing member 122 by press forming and a recessed part 124c is provided in the second reinforcing member 124 by press forming.

In a case where the recessed part 122c is provided by press forming, a processing method is devised such that the recessed part 122c can be formed in the process of bending the sheet material 130 in order to form the first reinforcing member 122, and various adjustments or corrections are performed on a press die or device for processing, or after the first reinforcing member 122 having a rectangular cross section is formed by bending the sheet material 130, the press forming is performed by inserting a die into the reinforcing member configured in a hollow shape, or the like. Therefore, a very complicated process for forming the recessed part 122c and labor and time for designing or preparation thereof are required. Further, in such a processing method, it is relatively difficult to obtain the dimensional accuracy of the recessed parts 122c and 124c. Therefore, in order to form the shape shown in FIG. 9 in which the thicknesses of the first reinforcing member 122 and the second reinforcing member 124 are reduced at the intersection portion, a process different from the normal processing method is required, and man-hours or time for appropriate manufacturing and preparation thereof is required. Further, in the configuration shown in FIG. 9, it is necessary to form the recessed parts 122c and 124c in both the first reinforcing member 122 and the second reinforcing member 124, which increases the number of steps. Even in a case where the first reinforcing member 122 and the second reinforcing member 124 are made of a solid material, if the recessed parts 122c and 124c are formed in both the first reinforcing member 122 and the second reinforcing member 124, the manufacturing process becomes complicated and the number of steps still increases.

In contrast, in the present embodiment, the groove part 122a is formed by providing an opening in the sheet material 130. The groove part 122a is easily formed by forming an opening portion in the sheet material 130 before bending the sheet material 130, and then bending the sheet material 130, as shown in FIG. 2. Further, the groove part 122a is provided only in the first reinforcing member 122, and processing for providing the groove part in the second reinforcing member 124 is unnecessary. Therefore, compared to the configuration shown in FIG. 9, it is possible to provide the intersection portion with a simpler process, and the manufacturing cost is reduced.

Further, in a case where the recessed parts 122c and 124c are formed in both the first reinforcing member 122 and the second reinforcing member 124 as in the configuration example shown in FIG. 9, since the thicknesses of both the first reinforcing member 122 and the second reinforcing member 124 are reduced at the positions of the recessed parts 122c and 124c, the strength of both the first reinforcing member 122 and the second reinforcing member 124 is reduced at the position of the intersection portion. Therefore, in a case where an impact load is applied from the vehicle outside, there is a possibility that the first reinforcing member 122 and the second reinforcing member 124 may be bent at the position of the intersection portion. If the first reinforcing member 122 and the second reinforcing member 124 are bent at the position of the intersection portion, there is a possibility that the transmission of the impact load between the first reinforcing member 122 and the second reinforcing member 124 through the intersection portion may become insufficient and the desired impact absorption performance may not be obtained.

In contrast, in the present embodiment, a groove part is not provided in the second reinforcing member 124 at the intersection portion, and thus in the second reinforcing member 124, the thickness in the vehicle inside-outside direction (the direction connecting the vehicle outside and the vehicle inside, or the direction perpendicular to the sheet surface of the outer panel 110) is not reduced. Then, the groove part 122a reducing the thickness in the vehicle inside-outside direction is provided only in the first reinforcing member 122. Then, the shape of the groove part 122a is made to be a shape matching the shape of the cross section of the second reinforcing member 124, and the intersection portion is formed by fitting the second reinforcing member 124 into the groove part 122a.

In the present embodiment, since a groove part is not provided in the second reinforcing member 124, a decrease in strength due to the provision of a groove part does not occur in the second reinforcing member 124. Further, as will be described later, the second reinforcing member 124 has a function of transmitting an impact load to the first reinforcing member 122 through the intersection portion. A groove part is not provided in the second reinforcing member 124, so that deformation of the second reinforcing member 124 at the position of the intersection portion is suppressed. Therefore, the impact load is reliably transmitted from the second reinforcing member 124 to the first reinforcing member 122.

Although a groove part is not provided in the second reinforcing member 124, the thickness in the vehicle inside-outside direction of the second reinforcing member 124 does not need to be the same over the entire length in the longitudinal direction. Since the second reinforcing member 124 is fixed to the inner panel 135 at both end portions thereof, the thickness in the vehicle inside-outside direction changes at the fixed portion to the inner panel 135. On the other hand, the thickness in the vehicle inside-outside direction is uniform at a portion closer to the center than at both end portions of the second reinforcing member 124. In other words, a groove part as provided in the first reinforcing member 122 is not provided in a portion close to the center than in both end portions of the second reinforcing member 124, and the thickness in the vehicle inside-outside direction is uniform without a large change. The thickness in the vehicle inside-outside direction of the second reinforcing member 124 being uniform means that the thickness is not reduced at the position of the intersection portion as compared with both sides of the intersection portion. Therefore, the thickness in the vehicle inside-outside direction of the second reinforcing member 124 being uniform includes, in addition to a configuration in which the thickness in the entire length of the second reinforcing member 124 is almost constant, a configuration in which the thickness gradually increases from both end portions to the center portion and reaches the maximum at the center portion, a configuration in which the thickness gradually decreases from both end portions to the center portion and reaches the minimized, or the like.

Figure 10:
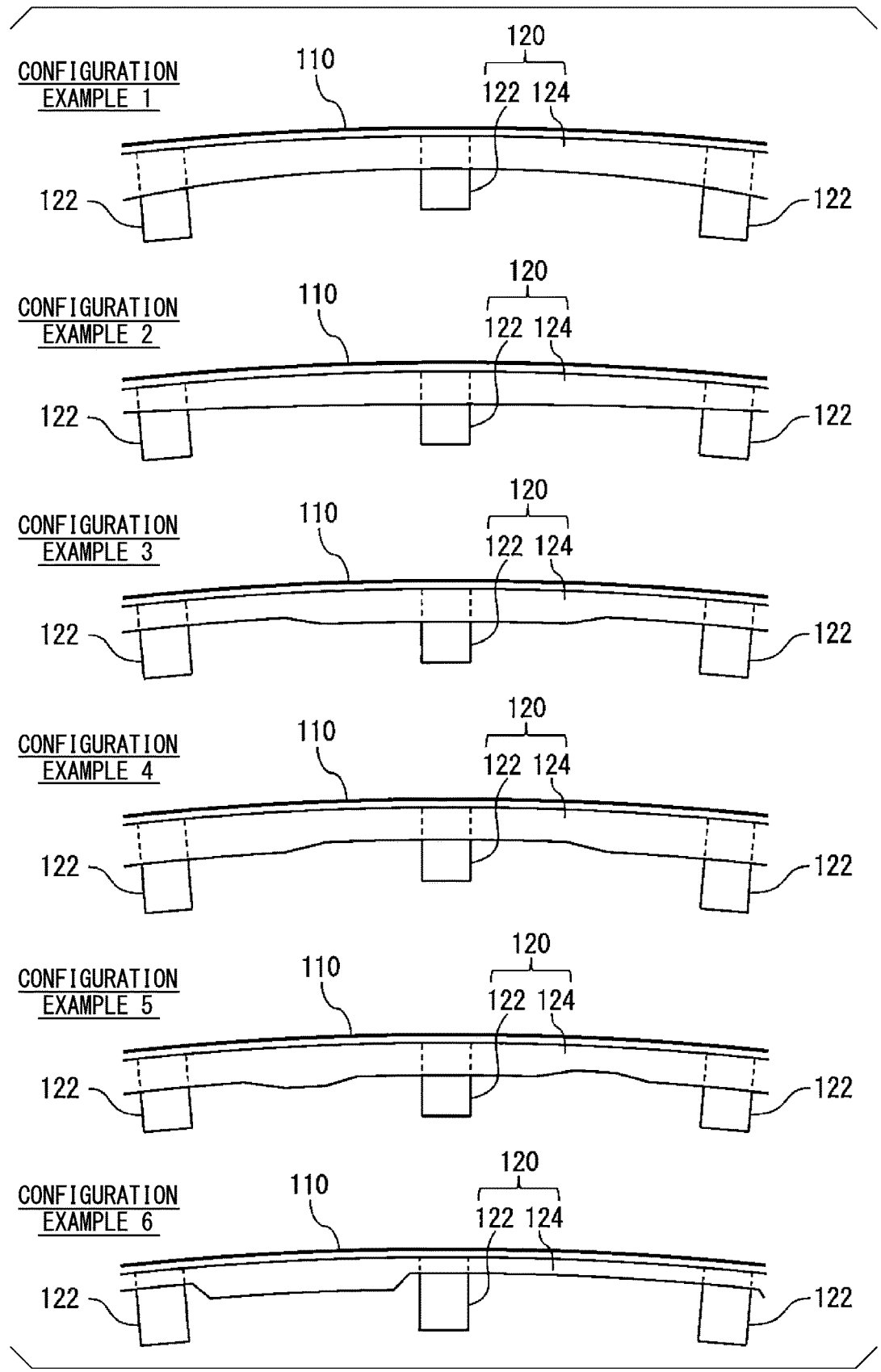
FIG. 10 is a schematic diagram showing configuration examples in which the thickness in a vehicle inside-outside direction of the second reinforcing member is uniform.

In the present embodiment. FIG. 10 is a schematic diagram showing configuration examples in which the thickness in the vehicle inside-outside direction of the second reinforcing member 124 is uniform. FIG. 10 is a diagram schematically showing the cross section at the position of the intersection portion where the first reinforcing member 122 and the second reinforcing member 124 intersect with each other, as in FIG. 4. In FIG. 10, unlike FIG. 4, the illustration of the sheet thickness of the sheet material 130 configuring the first reinforcing member 122 and the second reinforcing member 124 is omitted. Further, in FIG. 10, the illustration of the inner panel 135 is omitted.

In FIG. 10, examples in which the thickness in the vehicle inside-outside direction gradually changes in the entire length of the second reinforcing member 124 (Configuration Examples 1 and 2), and examples in which although the thickness of the second reinforcing member 124 changes, the thickness is not reduced at the position of the intersection portion as compared to both sides of the intersection portion (Configuration Examples 3 to 6) are shown in order from the top. As the examples in which the thickness in the vehicle inside-outside direction gradually changes in the entire length of the second reinforcing member 124. Configuration Example 1 in which the thickness is thinner toward the center of the exterior panel 100, and Configuration Example 2 in which the thickness is thicker toward the center of the exterior panel 100 are shown. As shown in FIG. 10, the configuration example in which the thickness in the vehicle inside-outside direction of the second reinforcing member 124 is uniform includes all the configuration examples in which the thickness of the second reinforcing member 124 does not change corresponding to the position of the intersection portion.

Next, a mechanism for absorbing a load in a case where the load is applied from the outside of the exterior panel 100 will be described.

In the present embodiment, in a case where an impact load is applied from the vehicle outside, the roles played by the first reinforcing member 122 and the second reinforcing member 124 are different. The first reinforcing member 122 and the second reinforcing member 124 have different deformation resistances to the impact load from the vehicle outside due to the differences in the length and the degree of curve in the exterior panel 100 even if they have the same thickness. For example, in a case where the exterior panel 100 is a door panel, since the door panel usually has a shape long in the horizontal direction, the first reinforcing member 122 is shorter than the second reinforcing member 124. Therefore, if the first reinforcing member 122 and the second reinforcing member 124 are considered to be beams fixed at both ends, in the first reinforcing member 122 having a shorter length, the deformation resistance in a case where a load is applied to the center in the longitudinal direction is higher than in the second reinforcing member 124 having a longer length. Therefore, in order to receive the impact load and perform impact absorption, the first reinforcing member 122 is more suitable than the second reinforcing member 124.

Further, if the first reinforcing member 122 is curved so as to be convex to the vehicle outside following the curvature of the outer panel 110, in a case where an impact load is applied from the vehicle outside, since an axial force of compression acts on the first reinforcing member 122 in the longitudinal direction, the deformation resistance to the application of a load becomes high. On the other hand, in the second reinforcing member 124 having less curve, in a case where an impact load is applied from the vehicle outside, an axial force of compression hardly acts in the longitudinal direction. Therefore, the first reinforcing member 122 is more excellent in impact resistance performance than the second reinforcing member 124 because, in a case where an impact load is applied, the axial force of compression acts, so that the deformation resistance tends to become higher.

If more detail description is made by taking a door panel of an automobile as an example, in many cases, a door of the automobile is configured such that the length in a vehicle length direction is longer when comparing the vehicle length direction with the vehicle height direction, except for a window frame portion. In members having the same cross-sectional shape, in a case where both end portions thereof are supported, a member having a longer length is more easily deformed when a load is applied to the center.

Therefore, comparing the second reinforcing member 124 that traverses in the vehicle length direction with the first reinforcing member 122 that traverses in the vehicle height direction, the first reinforcing member 122 that traverses in the vehicle height direction is stronger in the case of the same cross-sectional shape. Further, in the outer panel 110 of the door of the automobile, when comparing the vehicle length direction with the vehicle height direction, in many cases, the shape in the vehicle height direction of the cross section perpendicular to the vehicle length direction has a larger curvature convex to the outside in the vehicle width direction than the shape in the vehicle length direction of the cross section perpendicular to the vehicle height direction. In a case where the reinforcing member 120 has a shape along the outer panel 110, the axial force of compression acts on the first reinforcing member 122 having a large curvature convex on the outside in the vehicle width direction, in a case of receiving a load toward the inside in the vehicle width direction, that is, in a case of receiving a collision load on the side surface of the automobile. Therefore, the deformation to the inside in the vehicle width direction is further suppressed. That is, the first reinforcing member 122 can withstand a larger load than the second reinforcing member 124, and has high impact resistance performance. In other words, the first reinforcing member 122 extending in the vehicle height direction has higher impact absorption performance than the second reinforcing member 124 extending in the vehicle length direction. For this reason, a configuration is preferable in which the impact load in the vehicle width direction (the side collision load) is mainly absorbed by an impact absorbing member in the vehicle height direction. Therefore, in order to more efficiently improve the impact absorption performance, it is better to increase the bending rigidity of the first reinforcing member 122 rather than the second reinforcing member 124.

In order to transmit the impact load applied to the second reinforcing member 124 in the vehicle length direction to the first reinforcing member 122 in the vehicle height direction, the second reinforcing member 124 in the vehicle length direction is disposed on the vehicle outside (the outer panel 110 side) with respect to the first reinforcing member 122 in the vehicle height direction. In this way, even if an impact load is applied to any portion on the outside of the automobile door, the second reinforcing member 124 in the vehicle length direction can transmit the impact load to the first reinforcing member 122 in the vehicle height direction, and finally, the impact load can be absorbed by the first reinforcing member 122 in the vehicle height direction. At this time, since the main role of the second reinforcing member 124 is to transmit the load to the first reinforcing member 122, an influence on the impact absorption performance of the automobile door due to reducing the bending rigidity of the second reinforcing member 124 is smaller than an influence due to reducing the bending rigidity of the first reinforcing member 122. Since the bending rigidity becomes small in a case where the cross section of the reinforcing member is small or the sheet thickness of a constituent sheet material is thin, by setting the bending rigidity of the first reinforcing member 122 to be relatively large and the bending rigidity of the second reinforcing member 124 to be relatively small, it becomes possible to efficiently improve the impact absorption performance of the exterior panel 100 without accompanied by an excessive increase in weight. Further, by forming both the first reinforcing member 122 and the second reinforcing member 124 disposed lengthwise and breadthwise in shapes along the inside of the outer panel 110, it is also possible to improve the panel stiffness of the outer panel 110.

Then, by increase the bending rigidity by making the first reinforcing member 122, in which the deformation resistance in a case of receiving a load facing the inside in the vehicle width direction is high, and which is more suitable for impact absorption, thicker than the second reinforcing member 124, it is possible to further increase the deformation resistance of the first reinforcing member 122 and more effectively perform the impact absorption. In other words, by making the first reinforcing member 122 thicker than the second reinforcing member 124, the first reinforcing member 122, which has excellent impact resistance performance in terms of both the dimension and the shape, can mainly absorb the impact load.

The expression "the first reinforcing member 122 is "thicker" than the second reinforcing member 124" means that with respect to the region inside the contour of each member of the cross section orthogonal to the longitudinal direction of the first reinforcing member 122 or the second reinforcing member 124, the region of the second reinforcing member 124 is included in the region of the first reinforcing member 122. For example, in a case where each of the cross sections of the first reinforcing member 122 and the second reinforcing member 124 has a hollow rectangular shape as shown in FIG. 2, the expression "the first reinforcing member 122 is "thicker" than the second reinforcing member 124" means that with respect to the dimensions represented by D and H shown in FIG. 2, at least one dimension of the first reinforcing member 122 is larger than that of the second reinforcing member 124 and the other dimension is equal to or larger than that of the second reinforcing member 124.

On the other hand, the second reinforcing member 124 has a function of transmitting the impact load applied to the exterior panel 100 from the outside to the first reinforcing member 122. Therefore, at the intersection portion, the second reinforcing member 124 is located on the vehicle outside with respect to the first reinforcing member 122.

Therefore, when a collision load is applied to the exterior panel 100 from the vehicle body outside, the impact load is first transmitted from the outer panel 110 to the reinforcing member 120, and the reinforcing member 120 disposed adjacent to the outer panel 110 receives the impact load. At this time, since the second reinforcing member 124 is disposed on the vehicle outside with respect to the first reinforcing members 122 at the intersection portion, in a case where the impact load is applied between the plurality of first reinforcing members 122 adjacent to each other, the impact load is transmitted from the outer panel 110 to the second reinforcing member 124 and then transmitted to the first reinforcing member 122 while the second reinforcing member 124 is deformed. Since in the first reinforcing member 122, the bending rigidity is higher than that of the second reinforcing member 124 from the viewpoint of cross-sectional dimensions and the deformation resistance in a case where an impact load is applied is higher from the viewpoint of the length of the member and the curvature shape in which the outside in the vehicle width direction is convex, the impact load can be effectively absorbed by the first reinforcing member 122.

As described above, in a case where the reinforcing member 120 is configured by causing the two reinforcing members to intersect with each other, the reinforcing member having lower bending rigidity is disposed on the vehicle outside and the reinforcing member having higher bending rigidity is disposed on the vehicle inside. In this way, when an impact load is applied from the vehicle outside, the impact load is transmitted from the reinforcing member having lower bending rigidity to each of the plurality of reinforcing members having higher bending rigidity, and the impact load can be reliably absorbed by the plurality of reinforcing members having higher bending rigidity. Further, by making the bending rigidity of the reinforcing member on the vehicle outside relatively low, it is possible to provide the exterior panel 100 which is lighter in weight while maintaining the required strength. In the present embodiment, an example is shown in which the first reinforcing member 122 is disposed in the up-down direction (the vehicle height direction) and the second reinforcing member 124 is disposed in the horizontal direction (the vehicle length direction). However, the present embodiment is not limited to this, and a configuration is also acceptable in which the first reinforcing member 122 is disposed in the horizontal direction and the second reinforcing member 124 is disposed in the up-down direction. For example, in a case where the shape of the exterior panel 100 is a shape long in the up-down direction, or the exterior panel 100 is curved along the horizontal direction, it is preferable that the first reinforcing member 122 is disposed in the horizontal direction and the second reinforcing member 124 is disposed in the up-down direction. Further, the first reinforcing member 122 and the second reinforcing member 124 may be disposed diagonally with respect to the horizontal direction or the up-down direction and intersect with each other.

Incidentally, by providing the groove part 122*a* in the first reinforcing member 122, the thickness of the first reinforcing member 122 in the direction from the vehicle outside toward the vehicle inside is reduced at the position of the groove part 122*a* (the thickness-reduced portion). Therefore, only by simply providing the groove part 122*a* and causing the first reinforcing member 122 and the second reinforcing member 124 to intersect with each other, the strength of the first reinforcing member 122 is lowered at the position of the groove part 122*a*.

Therefore, in the present embodiment, the first reinforcing member 122 is disposed such that the vertical width of the groove part 122*a* is narrowed when receiving an impact load, and the second reinforcing member 124 is sandwiched in the groove part 122*a*, and in this way, a decrease in strength due to the provision of the groove part 122*a* is suppressed.

Figure 11:
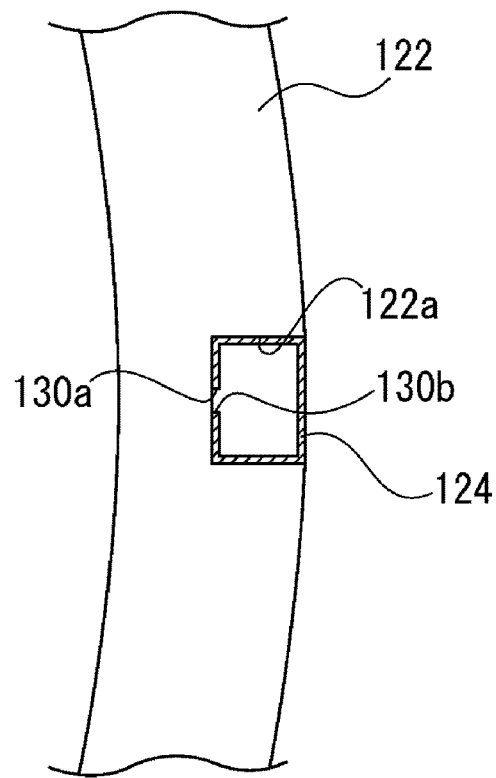
FIG. 11 is a schematic diagram for explaining the structure of the intersection portion.
Figure 12:
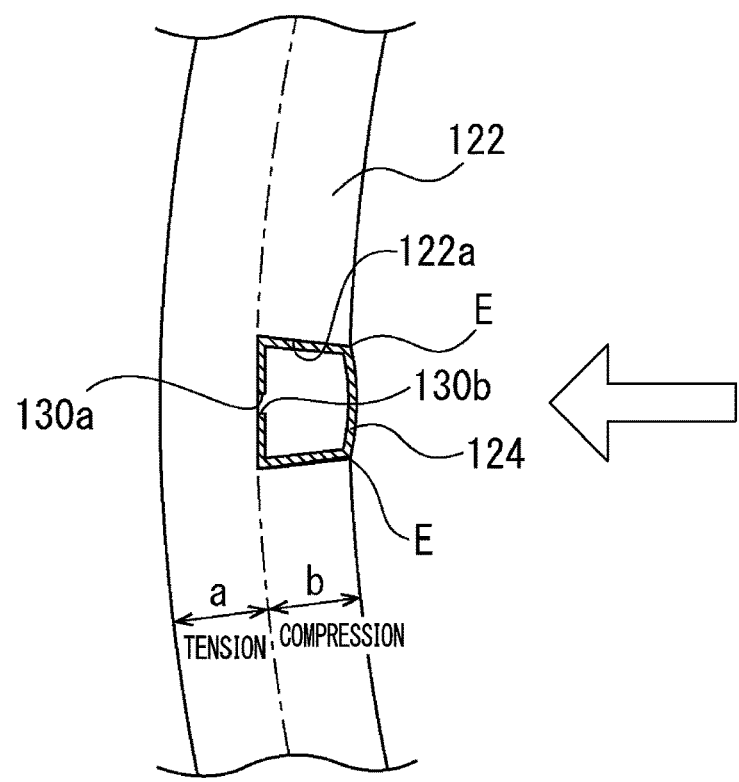
FIG. 12 is a schematic diagram for explaining the structure of the intersection portion.

FIGS. 11 and 12 are schematic diagrams for explaining the structure of the intersection portion. FIGS. 11 and 12 show a state where the intersection portion is viewed from the longitudinal direction of the second reinforcing member 124, and show a cross section in the second reinforcing member 124. FIG. 11 shows a state where an impact load is not applied to the first reinforcing member 122 and the second reinforcing member 124. Further, FIG. 12 shows a state where an impact load is applied to the first reinforcing member 122 and the second reinforcing member 124 in the direction of an arrow from the vehicle outside.

In the example shown in FIG. 11, the cross section of the first reinforcing member 122 has a rectangular shape as described with reference to FIG. 2, and the sides thereof include a long side of about 16 mm and a short side of about 10 mm. On the other hand, the cross section of the second reinforcing member 124 has a square shape with a side of about 8 mm. Further, the sheet thickness of each of the first reinforcing member 122 and the second reinforcing member 124 is about 0.8 mm. The shape of the cross section and the sheet thickness of each of the first reinforcing member 122 and the second reinforcing member 124 are not limited thereto. For example, the cross section of the second reinforcing member 124 may also have a rectangular shape.

As shown in FIG. 11, the shape of the groove part 122*a* in a case where the intersection portion is viewed from the longitudinal direction of the second reinforcing member 124 corresponds to the shape of the cross section of the second reinforcing member 124. That is, the shape of the groove part 122*a* is the same rectangular shape as the rectangular shape of the outer shape of the cross section of the second reinforcing member 124. Then, preferably, the second reinforcing member 124 is fitted into the groove part 122*a*.

In the state shown in FIG. 11, in a case where an impact load from the vehicle outside is applied between the plurality of first reinforcing members 122 adjacent to each other, the second reinforcing member 124 that has received the impact load is deformed and the second reinforcing member 124 transmits the impact load to the plurality of first reinforcing members 122 through the intersection portions while absorbing the impact load. The first reinforcing member 122 absorbs the impact load while being deformed to the vehicle inside. Further, in a case where an impact load is directly applied to the first reinforcing member 122, the first reinforcing member 122 absorbs the impact load while being deformed to the vehicle inside.

In this way, as shown in FIG. 12, the shape of the first reinforcing member 122, which was originally curved following the outer panel 110, is deformed in a direction of returning to a straight line. The groove part 122*a* is also deformed according to the deformation of the first reinforcing member 122. At this time, since the groove part 122*a* is disposed toward the vehicle outside, when the curve of the first reinforcing member 122 is deformed in the direction of returning to a straight line, the groove part 122*a* is deformed in a direction in which the width in the up-down direction is narrowed. In this way, the upper and lower end surfaces of the groove part 122*a* sandwich the second reinforcing member 124 therebetween.

More specifically, as shown in FIG. 12, the distance between upper and lower edges E of the groove part 122*a* is narrowed, and the edges E sandwich the bottom surface of the second reinforcing member 124 therebetween, so that the second reinforcing member 124 is sandwiched in the groove part 122*a*. The first reinforcing member 122 is deformed while sandwiching the second reinforcing member 124 in the groove parts 122*a*, so that the first reinforcing member 122 absorbs the impact load without causing breakage or the like at the position of the groove part 122*a*. In this way, a decrease in the strength of the first reinforcing member 122 due to the provision of the groove part 122*a* is compensated for by the groove part 122*a* sandwiching the second reinforcing member 124 therein. In other words, the second reinforcing member 124 is sandwiched in the groove part 122*a*, so that the strength of the first reinforcing member 122 becomes equivalent to that in a case where the groove part 122*a* is not provided. Therefore, a decrease in the strength of the first reinforcing member 122 due to the provision of the groove part 122*a* does not occur. Then, since a decrease in the strength of the first reinforcing member 122 due to the provision of the groove part 122*a* does not occur, when an impact load is applied, the first reinforcing member 122 is restrained from being deformed so as to be bent at the position of the groove part 122*a*. In this way, the first reinforcing member 122 is deformed in the direction in which the curve returns to a straight line as a whole, so that the impact load is effectively absorbed. Further, when the second reinforcing member 124 is sandwiched in the groove part 122*a* and the first reinforcing member 122 is deformed in the direction in which the curve returns to a straight line as a whole, a compressive force is applied to the bottom surface of the second reinforcing member 124 sandwiched between the upper and lower edges E of the groove part 122*a* in the direction along the longitudinal direction of the first reinforcing member 122. However, by appropriately setting the material strength of the second reinforcing member 124 to be high, the second reinforcing member 124 can withstand the compressive force while maintaining the surface shape of the bottom surface of the second reinforcing member 124, or with only a slight amount of bending to the outside of the surface, and it is possible to sufficiently transmit the axial force of compression in the longitudinal direction of the first reinforcing member 122 to the upper and lower sides of the groove part 122*a*.

As shown in FIG. 12, the depth of the groove part 122*a* is set to ½ of the thickness of the first reinforcing member 122. That is, in FIG. 12, a:b=1:1. More specifically, the depth of the groove part 122*a* is equal to or smaller than ½ of the thickness of the first reinforcing member 122 in the region adjacent to the groove part 122*a* outside the groove part 122*a*. Here, forces acting on the first reinforcing member 122 are different with the position (indicated by a dashed-dotted line in FIG. 12) of ½ of the thickness of the first reinforcing member 122 as a boundary. In the region on the vehicle outside with respect to the dashed-dotted line, when the curve of the first reinforcing member 122 is deformed in the direction of returning to a straight line, the region receives a compressive force, that is, an axial force of compression in the longitudinal direction (the axial direction) of the first reinforcing member 122. On the other hand, in the region on the vehicle inside with respect to the dashed-dotted line, when the curve of the first reinforcing member 122 is deformed in the direction of returning to a straight line, the region receives a tensile force in the longitudinal direction of the first reinforcing member 122.

Therefore, when the depth of the groove part 122*a* is equal to or smaller than ½ of the thickness of the first reinforcing member 122, the groove part 122*a* is provided in the region which receives the compressive force, in the first reinforcing member 122. Then, since the second reinforcing member 124 is inserted into the groove part 122*a*, the second reinforcing member 124 receives the compressive force. Therefore, since the compressive force is transmitted in the longitudinal direction of the region on the vehicle outside with respect to the dashed-dotted line of the first reinforcing member 122 through the second reinforcing member 124, it is possible to obtain impact absorption capacity equivalent to that in a case where the groove part 122*a* is not provided in the first reinforcing member 122, without a decrease in the strength of the first reinforcing member 122 due to the provision of the groove part 122*a*, as described above. Further, if the depth of the groove part 122*a* is equal to or smaller than ½ of the thickness of the first reinforcing member 122, since a tensile force does not act on the bottom of the groove part 122*a*, cracks do not occur in the bottom of the groove part 122*a*.

On the other hand, if the depth of the groove part 122*a* exceeds ½ of the thickness of the first reinforcing member 122, the bottom of the groove part 122*a* is located on the vehicle inside with respect to the position of the dashed-dotted line in FIG. 12. In this case, since the groove part 122*a* reaches the region that receives the tensile force on the vehicle inside with respect to the dashed-dotted line, the region that receives the tensile force in the longitudinal direction decreases in the thickness direction of the first reinforcing member 122, and the tensile force is concentrated on a narrower range. Further, since the bottom of the groove part 122*a* is located in the region receiving the tensile force on the vehicle inside with respect to the dashed-dotted line, in some cases, there is also a possibility that cracks may occur in the bottom of the groove part 122*a*. Therefore, the strength of the first reinforcing member 122 against the impact load is reduced. Therefore, it is preferable that the depth of the groove part 122*a* is equal to or smaller than ½ of the thickness of the first reinforcing member 122. In other words, in FIG. 12, it is preferable that the position of the bottom of the groove part 122*a* coincides with the position of the dashed-dotted line or is on the vehicle outside with respect to the position of the dashed-dotted line.

With the configuration as described above, since the groove part 122*a* is deformed when receiving an impact load and the second reinforcing member 124 is sandwiched in the groove part 122*a*, the first reinforcing member 122 and the second reinforcing member 124 are firmly coupled to each other at the intersection portion. Therefore, the impact load is reliably transmitted from the second reinforcing member 124 to the first reinforcing member 122 and absorbed. Further, the second reinforcing member 124 transmits the compressive force in the longitudinal direction of the first reinforcing member 122 to the upper and lower sides of the groove part 122*a*, so that it is possible to obtain the impact absorption capacity equivalent to that in a case where the groove part 122*a* is not provided in the first reinforcing member 122.

Here, when an impact load is applied to the exterior panel 100 from the vehicle outside, if the first reinforcing member 122 and the second reinforcing member 124 are separated from each other by the impact at the intersection portion, the impact load is not transmitted from the second reinforcing member 124 to the first reinforcing member 122, and the impact absorption performance cannot be maintained. For example, in a case where the second reinforcing member 124 is inserted into the groove part 122*a* facing the vehicle inside, if the curve of the first reinforcing member 122 is deformed in the direction of returning to a straight line, the vertical width of the groove part 122*a* is widened, and therefore, the first reinforcing member 122 and the second reinforcing member 124 are easily separated from each other at the intersection portion.

According to the present embodiment, the groove part 122*a* faces the vehicle outside, and therefore, in a case where an impact load is applied from the vehicle outside, the vertical width of the groove part 122*a* is narrowed and the upper and lower end surfaces of the groove part 122*a* sandwich the second reinforcing member 124 therebetween. Therefore, the first reinforcing member 122 and the second reinforcing member 124 are firmly coupled to each other at the intersection portion, and the first reinforcing member 122 and the second reinforcing member 124 are restrained from being separated from each other. In this way, the impact load is reliably transmitted from the second reinforcing member 124 to the first reinforcing member 122, and the impact load is reliably absorbed.

The second reinforcing member 124 does not need to be fitted into the groove part 122*a* at the intersection portion, and there may be a gap between the second reinforcing member 124 and the groove part 122*a*. Even with such a configuration, when an impact load is applied from the outside of the exterior panel 100, the width in the up-down direction of the groove part 122*a* is narrowed, and therefore, the second reinforcing member 124 can be sandwiched by the groove part 122*a*. In other words, the second reinforcing member 124 does not need to be fitted into the groove part 122*a*.

In the example shown in FIGS. 5 to 8, 11 and 12, the end portions 130*a* and 130*b* of the sheet material 130 configuring the first reinforcing member 122 are disposed on the surface on the vehicle inside (the top surface described above and the second surface). Similarly, the end portions 130*a* and 130*b* of the sheet material 130 configuring the second reinforcing member 124 are also disposed on the surface on the vehicle inside (the second surface described above). On the other hand, the end portions 130*a* and 130*b* may be disposed on the surface on the vehicle outside (the bottom surface described above and the first surface) so as to face the outer panel 110, as in the example of the second reinforcing member 124 shown in FIGS. 13 and 14.

In a case where the end portions 130*a* and 130*b* of the sheet material 130 configuring the second reinforcing member 124 are located on the vehicle outside, since the end portions 130*a* and 130*b* do not exist on the vehicle inside, the vehicle inside of the second reinforcing member 124 is not easily crushed when the groove part 122*a* is deformed. Therefore, when an impact load is applied, the second reinforcing member 124 is reliably sandwiched in the groove part 122*a*, and the second reinforcing member 124 does not easily come off from the groove part 122*a*.

Figure 13:
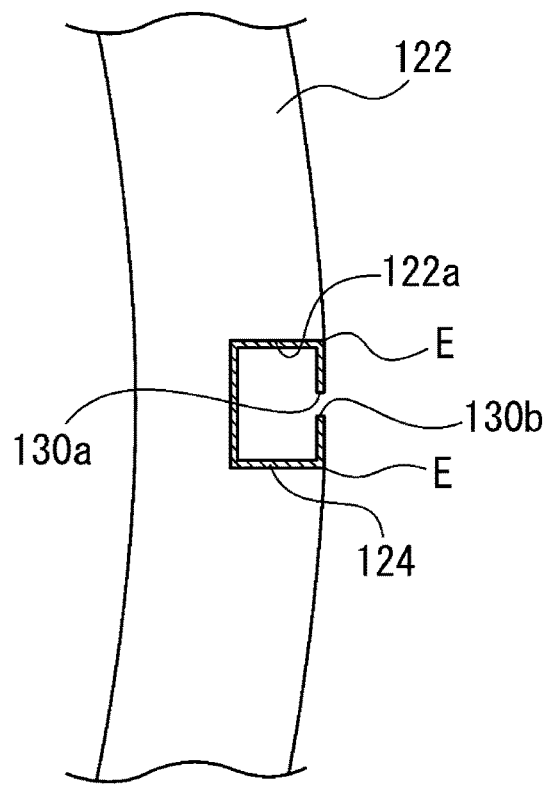
FIG. 13 is a schematic diagram showing a case where end portions of a sheet material configuring the second reinforcing member are located on the vehicle outside.
Figure 14:
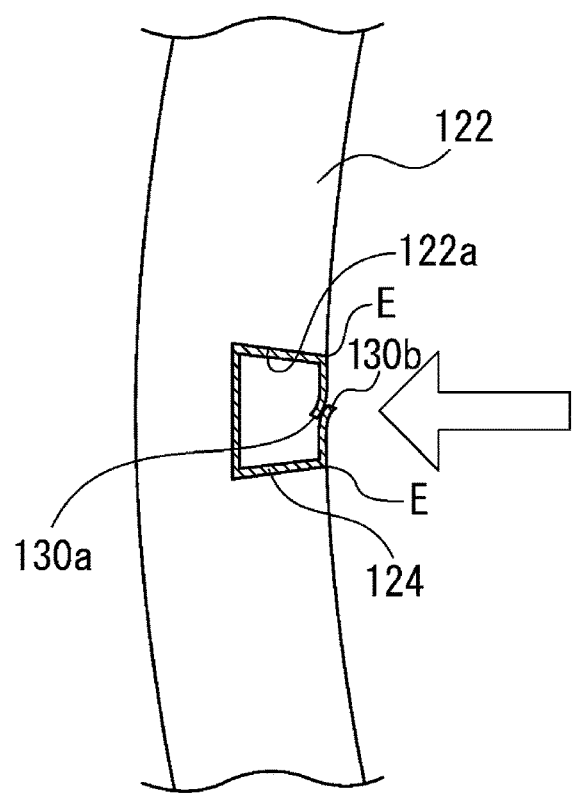
FIG. 14 is a schematic diagram showing a case where the end portions of the sheet material configuring the second reinforcing member are located on the vehicle outside.

A state where an impact load is absorbed is different according to whether the end portions 130*a* and 130*b* of the sheet material 130 configuring the second reinforcing member 124 are disposed on the surface on the vehicle inside or the surface on the vehicle outside. Further, a state where an impact load is absorbed is also different according to whether or not curved portions 132 (described later) are provided in the end portions 130*a* and 130*b*. In the following, these differences will be described in detail. FIGS. 13 and 14 are schematic diagrams showing a case where the end portions 130*a* and 130*b* of the second reinforcing member 124 are located on the vehicle outside, and show a cross section in the second reinforcing member 124, as in FIGS. 11 and 12, and show a state where the intersection portion is viewed from the longitudinal direction of the second reinforcing member 124. FIG. 13 shows a state where an impact load is not applied to the first reinforcing member 122 and the second reinforcing member 124. Further. FIG. 14 shows a state where an impact load is applied to the first reinforcing member 122 and the second reinforcing member 124 in the direction of an arrow from the vehicle outside, and shows a state where the second reinforcing member 124 is sandwiched in the groove part 122*a* and the end portions 130*a* and 130*b* of the second reinforcing member 124 overlap each other. In a case where the end portions 130*a* and 130*b* are located on the vehicle outside of the second reinforcing member 124, when the end portions 130*a* and 130*b* of the second reinforcing member 124 overlap each other, the width of the surface (the bottom surface) on which the end portions 130*a* and 130*b* are located is narrowed. However, the width of the surface (the top surface) facing the surface on which the end portions 130*a* and 130*b* are located, that is, the surface on the vehicle inside, hardly changes, and the cross section of the second reinforcing member 124 approaches a trapezoidal shape in a pseudo manner. On the other hand, if the groove part 122*a* is deformed, so that the distance between the upper and lower edges E is narrowed, the shape of the groove part 122*a* viewed from the longitudinal direction of the second reinforcing member 124 also approaches a trapezoidal shape in a pseudo manner. That is, both the cross-sectional shape of the second reinforcing member 124 and the shape of the groove part 122*a* approach a trapezoidal shape in a pseudo manner. Therefore, as shown in FIGS. 13 and 14, in a case where the end portions 130*a* and 130*b* of the second reinforcing member 124 are located on the vehicle outside, even in a case where the end portions 130*a* and 130*b* overlap each other, the width of the surface (top surface) on the vehicle inside the second reinforcing member 124 hardly changes, and both the cross-sectional shape of the second reinforcing member 124 and the shape of the groove part 122*a* approach a trapezoidal shape in which the width facing the vehicle outside is narrowed, and therefore, the second reinforcing member 124 does not easily come off from the groove part 122*a* in which the distance between the upper and lower edges E is narrowed. Therefore, considering that the end portions 130*a* and 130*b* overlap each other, it is preferable that the end portions 130*a* and 130*b* of the second reinforcing member 124 are located on the vehicle outside. Further, if the curved portions 132 (described later) are provided in the end portions 130*a* and 130*b* of the second reinforcing member 124*h*, the overlap as shown in FIG. 14 is suppressed, and therefore, the upper and lower end surfaces of the groove part 122*a* sandwich the second reinforcing member 124 therebetween, so that the axial force of compression in the longitudinal direction of the first reinforcing member 122 is transmitted to the upper and lower sides of the groove part 122*a* through the second reinforcing member 124. Therefore, it is possible to obtain the impact absorption capacity equivalent to that in a case where the groove part 122*a* is not provided in the first reinforcing member 122.

Figure 15:
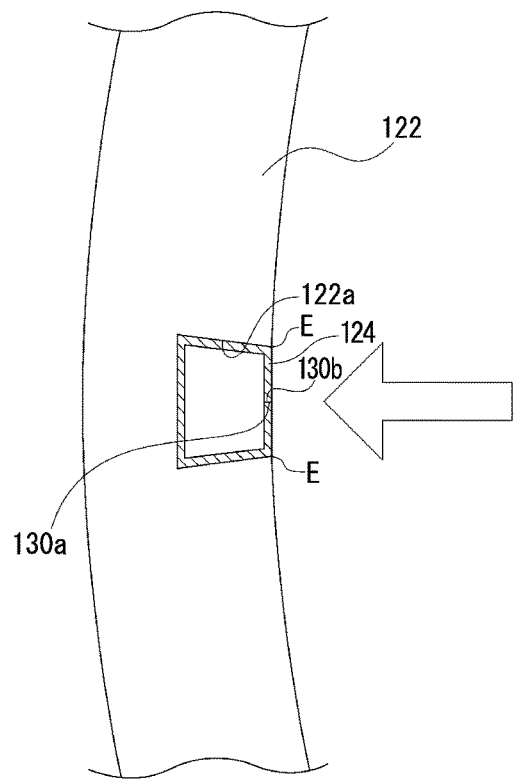
FIG. 15 is a schematic diagram showing a state where a gap between the end portions of the sheet material configuring the second reinforcing member is closed by receiving an impact load.

On the other hand, it is preferable that the end portions 130*a* and 130*b* of the second reinforcing member 124 are in contact with each other in a state where the second reinforcing member 124 is assembled to the exterior panel 100. However, there is a case where a gap is formed between the end portions 130*a* and 130*b* due to processing accuracy, dimensional tolerance, or the like. In a case where there is a gap between the end portions 130*a* and 130*b* of the second reinforcing member 124 and the end portions 130*a* and 130*b* are located on the vehicle outside of the second reinforcing member 124, as shown in FIG. 13, when the groove part 122*a* is deformed by receiving an impact load, so that the distance between the upper and lower edges E is narrowed and the vehicle outside of the second reinforcing member 124 is sandwiched between the edges F, until the gap between the end portions 130*a* and 130*b* is closed as shown in FIG. 15, the transmission of the axial force of compression in the longitudinal direction of the first reinforcing member 122 through the second reinforcing member 124 is not sufficient, that is, the axial force of compression in the longitudinal direction of the first reinforcing member 122 is not sufficiently transmitted to the upper and lower sides of the groove part 122*a* through the second reinforcing member 124, and during that time, there is a possibility that the impact absorption capacity may be temporarily reduced. However, in a case where the end portions 130*a* and 130*b* are located on the vehicle inside of the second reinforcing member 124, as shown in FIGS. 11 and 12, since the end portions 130*a* and 130*b* do not exist on the vehicle outside of the second reinforcing member 124 and a gap also do not exist. Therefore, when the groove part 122*a* is deformed by receiving an impact load, so that the distance between the upper and lower edges E is narrowed and the vehicle outside of the second reinforcing member 124 is sandwiched between the edges F, the axial force of compression in the longitudinal direction of the first reinforcing member 122 is transmitted to the upper and lower sides of the groove part 122*a* through the second reinforcing member 124 from immediately after the edges E sandwich the second reinforcing member 124 therebetween. Then, the axial force of compression in the longitudinal direction of the first reinforcing member 122 is transmitted to the upper and lower sides of the groove part 122*a* through the second reinforcing member 124 from immediately after the edges E sandwich the second reinforcing member 124 therebetween. Therefore, it is possible to obtain the impact absorption capacity equivalent to that in a case where the groove part 122*a* is not provided in the first reinforcing member 122. Therefore, in a case where there is a gap between the end portions 130*a* and 130*b* of the second reinforcing member 124, it is more preferable that the end portions 130*a* and 130*b* are located on the vehicle inside of the second reinforcing member 124, as shown in FIGS. 11 and 12. Further, by providing the curved portion 132 (described later), the end portions 130*a* and 130*b* reliably come into contact with each other when an impact load is applied, the second reinforcing member 124 is not easily crushed, and the second reinforcing member 124 does not easily come off from the first reinforcing member 122. Therefore, in a case where the end portions 130*a* and 130*b* are located on the vehicle inside of the second reinforcing member 124, if the curved portions 132 (described later) are provided in the end portions 130*a* and 130*b*, since the end portions 130*a* and 130*b* reliably come into contact with each other and the second reinforcing member 124 is not easily crushed, and thus it is most preferable. The configuration of the curved portion 132 will be described in detail later.

Figure 16:
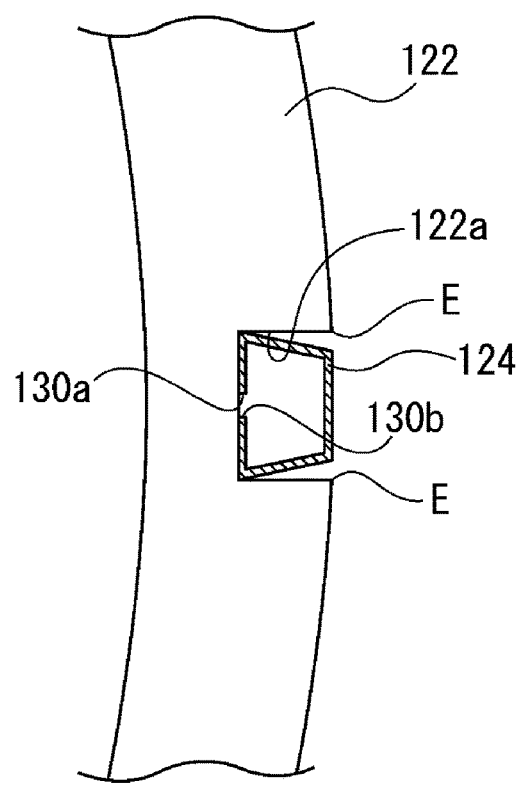
FIG. 16 is a schematic diagram showing a variation of the structure of the intersection portion.
Figure 17:
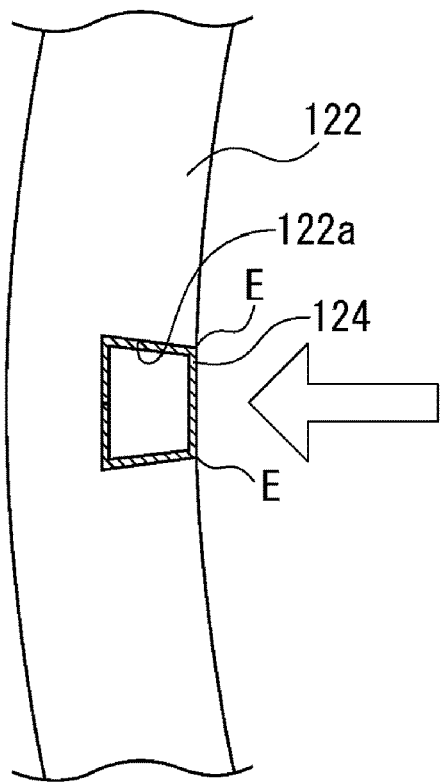
FIG. 17 is a schematic diagram showing the variation of the structure of the intersection portion.

FIGS. 16 and 17 are schematic diagrams showing a variation of the structure of the intersection portion. FIGS. 16 and 17 show a cross section in the second reinforcing member 124, as in FIGS. 11 and 12, and show a state where the intersection portion is viewed from the longitudinal direction of the second reinforcing member 124.

FIGS. 16 and 17 show an example in which the cross section of the second reinforcing member 124 has a trapezoidal shape. In FIGS. 16 and 17, the width of the bottom surface of the second reinforcing member 124 is narrower than the width of the top surface. FIG. 16 shows a state where an impact load is not applied to the first reinforcing member 122 and the second reinforcing member 124. Further. FIG. 17 shows a state where an impact load is applied to the first reinforcing member 122 and the second reinforcing member 124 in the direction of an arrow from the vehicle outside.

If an impact load is applied from the vehicle outside in the state shown in FIG. 16, the curve of the first reinforcing member 122 is deformed in the direction of returning to a straight line, the distance between the upper and lower edges E of the groove part 122*a* is narrowed, and the second reinforcing member 124 is sandwiched in the groove part 122*a*. At this time, since the cross section of the second reinforcing member 124 is a trapezoidal shape and is a wedge-shaped shape that is tapered toward the vehicle outside, when the groove part 122*a* is deformed to sandwich the second reinforcing member 124 therein, it becomes more difficult for the second reinforcing member 124 does not more easily come off from the groove part 122*a*. Therefore, at the intersection portion, the first reinforcing member 122 and the second reinforcing member 124 are more firmly coupled to each other when an impact load is applied, and the first reinforcing member 122 and the second reinforcing member 124 are restrained from being separated from each other. Therefore, an impact load is reliably transmitted from the second reinforcing member 124 to the first reinforcing member 122, and the impact load is reliably absorbed.

Figure 18:
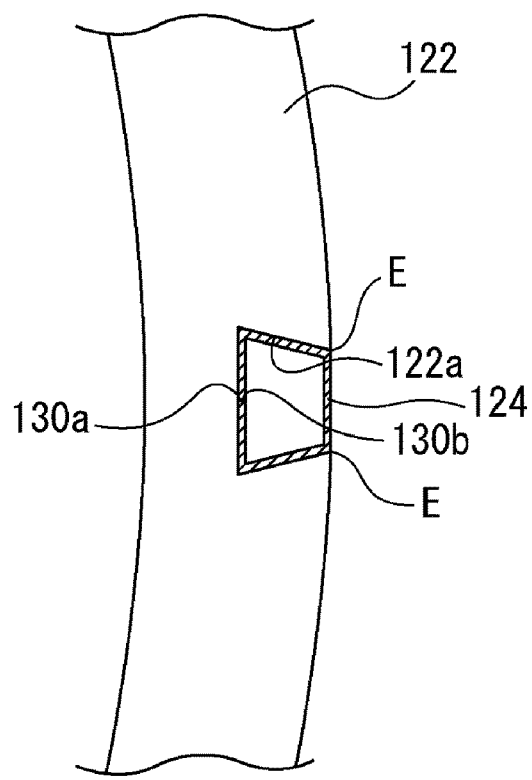
FIG. 18 is a schematic diagram showing an example in which the shape of a groove part of the first reinforcing member is formed in a trapezoidal shape in accordance with the shape of the cross section of the second reinforcing member.
Figure 19:
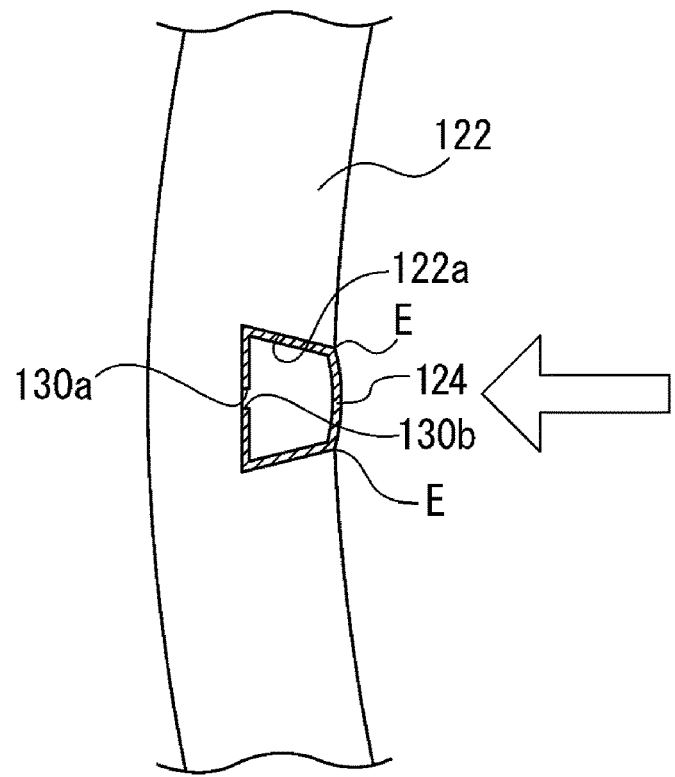
FIG. 19 is a schematic diagram showing an example in which the shape of the groove part of the first reinforcing member is formed in a trapezoidal shape in accordance with the shape of a cross section of the second reinforcing member.

FIGS. 18 and 19 show an example in which the cross section of the second reinforcing member 124 has a trapezoidal shape, as in FIGS. 16 and 17, and the shape of the groove part 122*a* is made to be a trapezoidal shape in accordance with the shape of the cross section of the second reinforcing member. The shape of the groove part 122*a* is a shape that substantially follows the cross section of the second reinforcing member 124. Further, a slight gap may be provided between the groove part 122*a* and the cross section of the second reinforcing member 124. FIG. 18 shows a state where an impact load is not applied to the first reinforcing member 122 and the second reinforcing member 124. Further, FIG. 19 shows a state where an impact load is applied to the first reinforcing member 122 and the second reinforcing member 124 in the direction of an arrow from the vehicle outside.

If an impact load is applied from the vehicle outside in the state shown in FIG. 18, the curve of the first reinforcing member 122 is deformed in the direction of returning to a straight line, and the distance between the upper and lower edges E of the groove part 122*a* is narrowed, and the second reinforcing member 124 is sandwiched in the groove part 122*a*, as shown in FIG. 19. At this time, in the configuration of FIG. 18, the shape of the groove part 122*a* is a trapezoidal shape that follows the shape of the cross section of the second reinforcing member 124, and therefore, comparing with the configuration of FIGS. 16 and 17, when the groove part 122*a* is deformed, the axial force of compression in the longitudinal direction of the first reinforcing member 122 is transmitted to the upper and lower sides of the groove part 122*a* through the second reinforcing member 124 from immediately after the upper and lower end surfaces of the groove part 122*a* sandwich the second reinforcing member 124 therebetween, and therefore, the second reinforcing member 124 is reliably sandwiched in the groove part 122*a*. Therefore, at the intersection portion, the first reinforcing member 122 and the second reinforcing member 124 are more firmly coupled to each other when an impact load is applied, and the first reinforcing member 122 and the second reinforcing member 124 are restrained from being separated from each other. Therefore, an impact load is reliably transmitted from the second reinforcing member 124 to the first reinforcing member 122, and the impact load is reliably absorbed.

In the case of the example shown in FIG. 18, when the second reinforcing member 124 is inserted into the groove part 122*a* of the first reinforcing member 122, it is favorable if, for example, a method of inserting the second reinforcing member 124 into the groove part 122*a* by elastically deforming the first reinforcing member 122 in a direction in which the curve of the first reinforcing member 122 becomes stronger, a method of partially providing a portion having a rectangular shape in a cross section having dimensions in which the width of the top surface is the same as the width of the bottom surface, at a position other than the intersection portion in the longitudinal direction of the second reinforcing member 124, inserting the second reinforcing member 124 into the groove part 122*a* from the portion, and then sliding the second reinforcing member 124 to the position of the intersection portion, or the like is used.

Next, a configuration will be described in which when the groove part 122*a* is deformed, the shape of the cross section of the second reinforcing member 124 is restrained from collapsing, so that the second reinforcing member 124 is reliably sandwiched in the groove part 122*a*.

When an impact load is applied, the second reinforcing member 124 is sandwiched in the groove part 122a, so that a force in the direction of crushing the second reinforcing member 124 in the up-down direction acts on the second reinforcing member 124. At this time, if the end portions 130a and 130b of the second reinforcing member 124 come into contact with each other and come into close contact with each other, the shape of the cross section of the second reinforcing member 124 is maintained. Therefore, the second reinforcing member 124 can be reliably sandwiched in the groove part 122a, and the compressive force in the longitudinal direction on the vehicle outside of the first reinforcing member 122 can be transmitted more reliably.

On the other hand, when the second reinforcing member 124 is sandwiched in the groove part 122a, if the end portions 130a and 130b of the second reinforcing member 124 do not come into contact with each other and the end portions 130a and 130b overlap each other, the shape of the cross section of the second reinforcing member 124 collapses. If the end portions 130a and 130b overlap each other, the second reinforcing member 124 becomes thinner as compared with a case where the end portions 130a and 130b come into contact with each other. Therefore, since the area of the cross section of the second reinforcing member 124 becomes smaller, the second reinforcing member 124 cannot be reliably sandwiched in the groove part 122a, the compressive force in the longitudinal direction on the vehicle outside of the first reinforcing member 122 cannot be sufficiently transmitted, and the second reinforcing member 124 easily come off from the groove part 122a.

Therefore, it is necessary to bring the end portions 130a and 130b into contact with each other when the groove part 122a is deformed, thereby restraining the cross-sectional shape of the second reinforcing member 124 from collapsing, and reliably sandwiching the second reinforcing member 124 in the groove part 122a.

Figure 20:
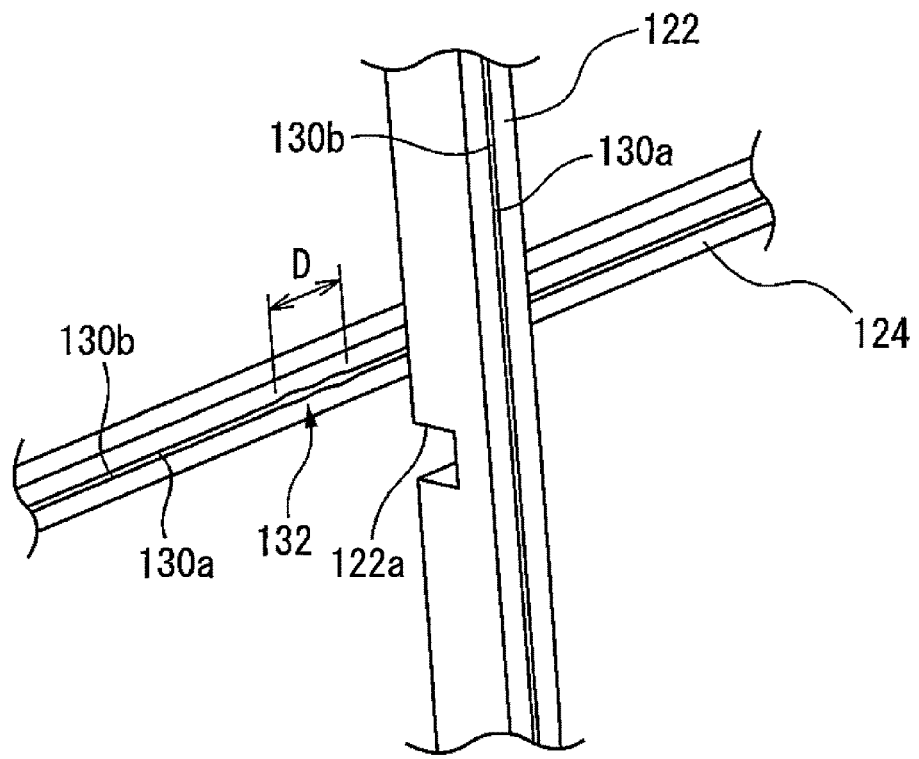
FIG. 20 is schematic diagram showing an example in which curved portions are provided in the end portions of the sheet material configuring the second reinforcing member at the position of the intersection portion.

Therefore, FIG. 20 shows an example in which the curved portions 132 are provided in the end portions 130a and 130b of the sheet material 130 configuring the second reinforcing member 124 at the position of the intersection portion. FIG. 20 is a diagram showing a state where the intersection portion is viewed from the vehicle inside, as in FIG. 8, and is a perspective view showing a state where the first reinforcing member 122 and the second reinforcing member 124 are separated from each other at the intersection portion.

The curved portions 132 are provided in the end portions 130a and 130b of the second reinforcing member 124 disposed toward the vehicle inside in a range D in which the second reinforcing member 124 is inserted into the groove part 122a of the first reinforcing member 122. Preferably, the curved portion 132 is provided over a wider range than the range D in which the second reinforcing member 124 is inserted into the groove part 122a of the first reinforcing member 122. On the other hand, the curved portion 132 may be provided in the vicinity of the range D outside the range D in which the second reinforcing member 124 is inserted into the groove part 122a of the first reinforcing member 122. Even if the position where the curved portion 132 is provided is outside the range D, by disposing the curved portion 132 in proximity to the range D, that is, the intersection portion, it is possible to obtain the effect equivalent to that in a case of providing the curved portion 132 in the range D.

Figure 21:
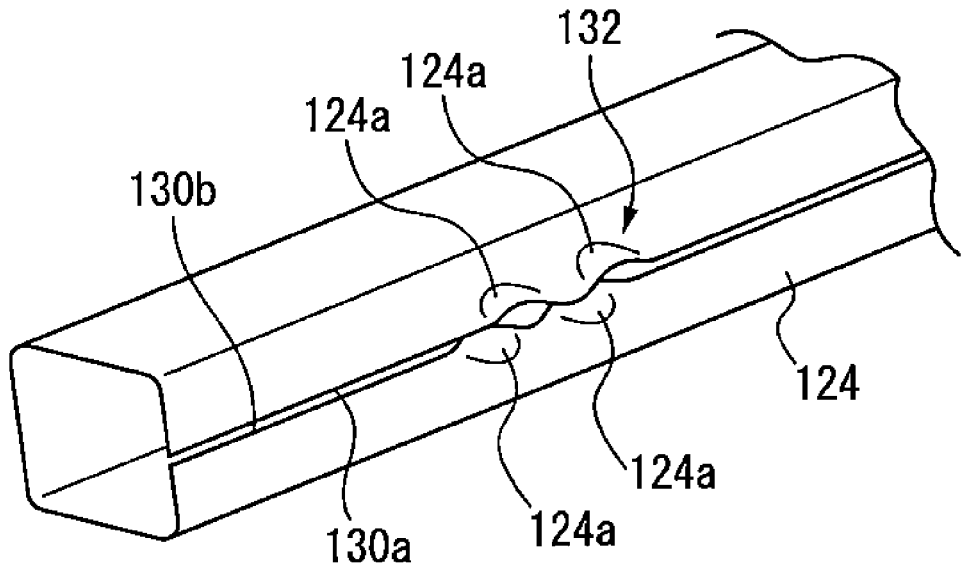
FIG. 21 is a perspective view showing in detail the curved portions provided in the end portions of the sheet material configuring the second reinforcing member.
Figure 22:
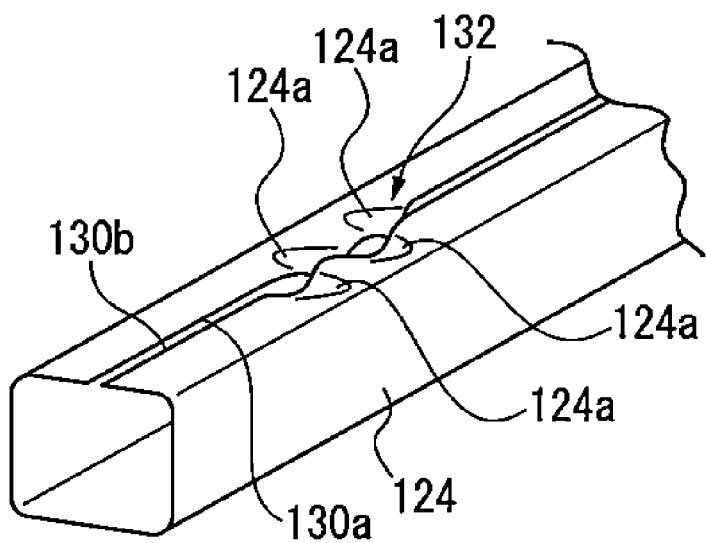
FIG. 22 is a perspective view showing in detail the curved portions provided in the end portions of the sheet material configuring the second reinforcing member.

FIGS. 21 and 22 are perspective views showing in detail the curved portions 132 provided in the second reinforcing member 124. The curved portions 132 are configured by forming concave surfaces 124a on the front and rear surfaces of the sheet material 130 at the end portions 130a and 130b of the sheet material 130. In the longitudinal direction of the second reinforcing member 124, the positions of the concave surfaces 124a deviate from each other between the curved portion 132 provided in the end portion 130a and the curved portion 132 provided in the end portion 130b. In this way, when the groove part 122a is deformed to sandwich the second reinforcing member 124 therein, the end portions 130a and 130b do not overlap each other, and the end portions 130a and 130b reliably come into contact with each other.

Figure 23:
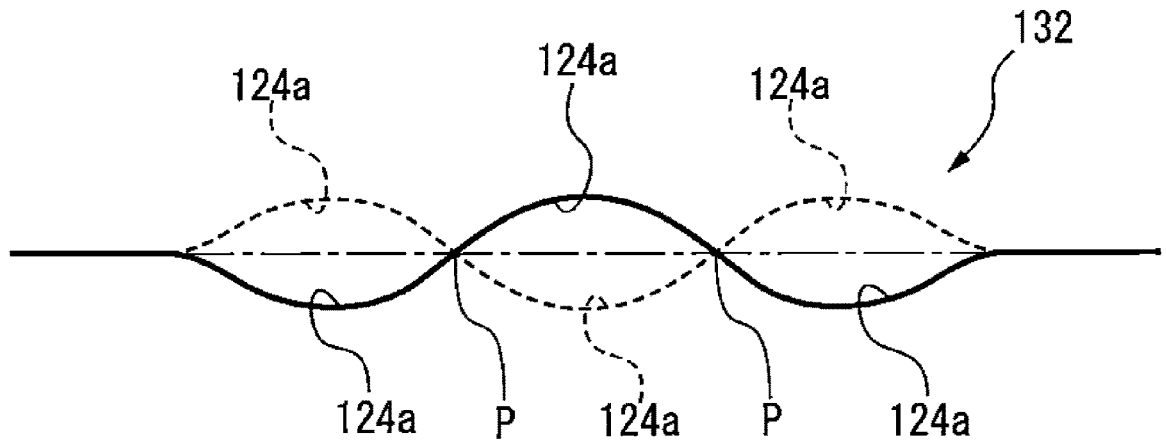
FIG. 23 is a schematic diagram showing an example of the positional relationship between concave surfaces of the curved portions provided in the end portions of the sheet material configuring the second reinforcing member.

FIG. 23 is a schematic diagram showing the positional relationship between the position of the concave surface 124a provided on the end portion 130a and the position of the concave surface 124a provided on the end portion 130b. In FIG. 23, a state is schematically shown in which the curved portion 132 is viewed from a direction orthogonal to the longitudinal direction of the second reinforcing member 124 and along the top surface of the second reinforcing member 124. In FIG. 23, a solid line shows the shape of the curved portion 132 provided in the end portion 130a, and a broken line shows the shape of the curved portion 132 provided in the end portion 130b.

In the example shown in FIG. 23, the curved portion 132 of the end portion 130a is composed of two concave surfaces 124a provided on the front side and one concave surface 124a provided on the back side between the two concave surfaces 124a on the front side. Further, the curved portion 132 of the end portion 130b is composed of two concave surfaces 124a provided on the back side and one concave surface 124a provided on the front side between the two concave surfaces 124a on the back side.

Then, since the positions of the curved portion 132 of the end portion 130a and the curved portion 132 of the end portion 130b deviate from each other as shown in FIG. 23, when the groove part 122a of the first reinforcing member 122 is deformed to sandwich the second reinforcing member 124 therein, the end portions 130a and 130b come into contact with each other at the position of a point P (an end edge intersection portion) shown in FIG. 23. Therefore, when the groove part 122a is deformed, the end portions 130a and 130b is restrained from overlapping each other to collapse the cross-sectional shape of the second reinforcing member 124. In this way, since the second reinforcing member 124 is reliably sandwiched by the groove part 122a, the second reinforcing member 124 does not come off from the groove part 122a when an impact load is applied, the impact load is reliably transmitted from the second reinforcing member 124 to the first reinforcing member 122, and the compressive force in the longitudinal direction on the vehicle outside of the first reinforcing member 122 is reliably transmitted in the first reinforcing member 122 through the second reinforcing member 124. Therefore, the impact load is reliably absorbed by the first reinforcing member 122 and the second reinforcing member 124.

Figure 24:
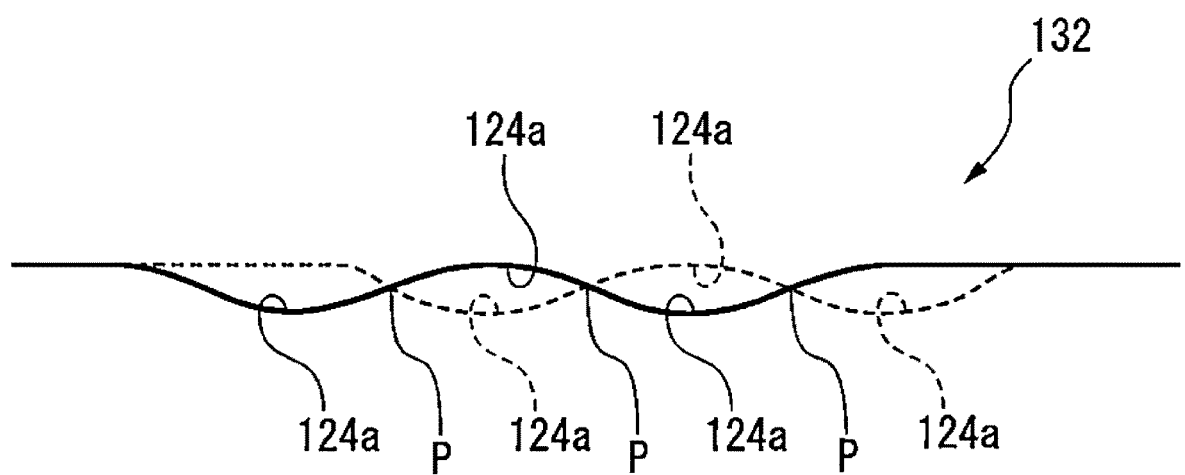
FIG. 24 is a schematic diagram showing an example in which bulges due to the concave surfaces of the curved portions are formed only on the inside of the surface on which the end portions of the sheet material configuring the second reinforcing member are disposed.

In FIG. 23, an example in which three concave surfaces 124a are provided on each of the end portions 130a and 130b is shown. However, the number of concave surfaces 124a is not limited to this. Further, in FIG. 23, an example is shown in which as the shape of the curved portion 132 provided in each of the end portions 130a and 130b, bulges due to the concave surfaces 124a of the second reinforcing member 124 are formed on the inner side and outer side of the top surface of the second reinforcing member 124. However, the shape of the curved portion 132 is not limited to this. For example, as shown in FIG. 24, bulges due to the concave surfaces 124a of the curved portion 132 may be formed only on the inner side of the surface on which the end portions 130a and 130b of the second reinforcing member 124 are formed. With the configuration in which the bulges due to the concave surfaces 124a are formed only on the inner side of the surface on which the end portions 130a and 130b of the second reinforcing member 124 are formed, in a case where the curved portion 132 is disposed in the range D to be inserted into the groove part 122a of the first reinforcing member 122, since the second reinforcing member 124 is fitted into the groove part 122a without interference of the bottom of the groove part 122a with the bulge of the curved portion 132, it is preferable.

Figure 25:
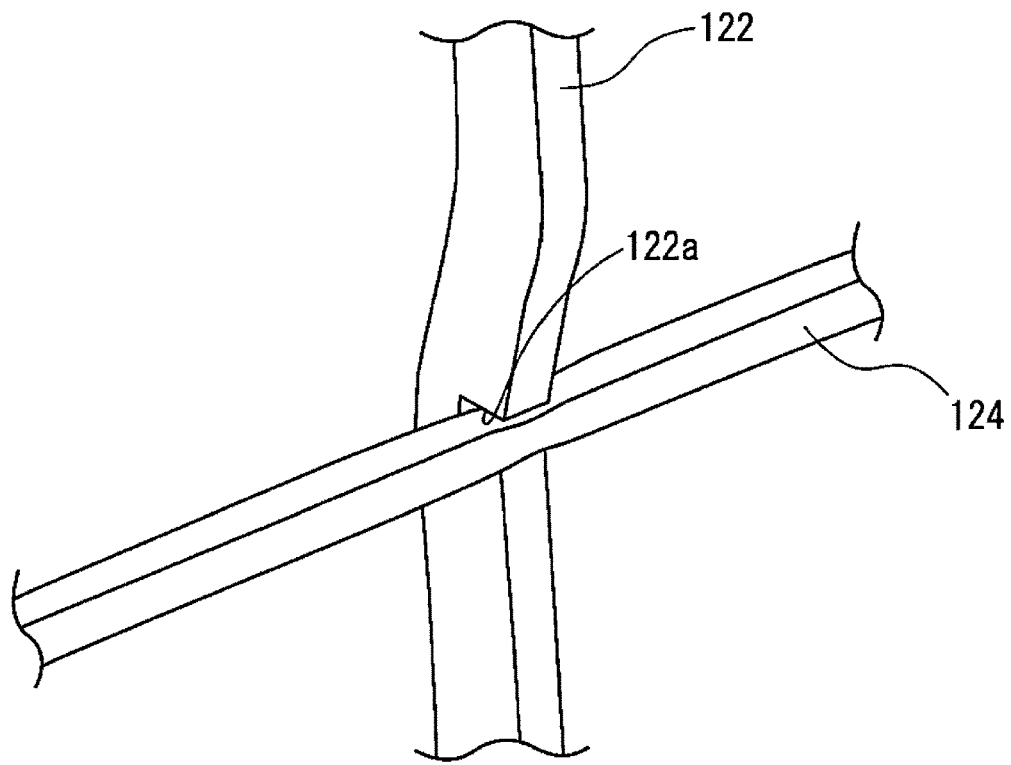
FIG. 25 is a schematic diagram showing a state where an impact load is applied from the outside of the exterior panel in a case where the curved portions are provided at the end portions of the sheet material configuring the second reinforcing member.

FIG. 25 is a perspective view showing a state where the configuration shown in FIG. 20 is viewed from the vehicle outside, and is a schematic diagram showing a state where an impact load is applied from the outside of the exterior panel 100 in a state where the second reinforcing member 124 is inserted into the groove part 122a. Due to providing the curved portions 132 in the end portions 130a and 130b, the end portions 130a and 130b are restrained from overlapping each other when the groove part 122a is deformed to sandwich the second reinforcing member 124 therein. Therefore, as shown in FIG. 25, when the groove part 122a is deformed, the second reinforcing member 124 is not crushed to collapse the cross-sectional shape, and the second reinforcing member 124 is reliably sandwiched in the groove part 122a.

Further, as shown in FIG. 20, if the end portions 130a and 130b of the sheet material 130 configuring the second reinforcing member 124 are located on the vehicle inside, when the groove part 122a is deformed by an impact load, the vehicle inside of the second reinforcing member 124 is not easily crushed due to the provision of the curved portion 132. Further, the vehicle outside of the second reinforcing member 124 has a shape that is not easily crushed because the end portions 130a and 130b do not exist originally. Therefore, when the groove part 122a is deformed, both the vehicle inside and the vehicle outside of the second reinforcing member 124 are not easily crushed, and the cross-sectional shape of the second reinforcing member 124 is restrained from collapsing. Further, since the second reinforcing member 124 is not easily crushed at the intersection portion, the deformation of the first reinforcing member 122 at the position of the groove part 122a is reliably suppressed. Therefore, the impact load is reliably absorbed.

In FIG. 20, an example is shown in which in a case where the end portions 130a and 130b are located on the vehicle inside of the second reinforcing member 124, the curved portions 132 are provided in the end portions 130a and 130b. However, in a case where the end portions 130a and 130b are located on the vehicle outside, the curved portions 132 may be provided in the end portions 130a and 130b. Even in this case, in a case where the groove part 122a is deformed to sandwich the second reinforcing member 124 therein, the vehicle outside on which the curved portions 132 are provided is not easily crushed. Therefore, the deformation of the first reinforcing member 122 is reliably suppressed at the position of the groove part 122a, and the impact load is reliably absorbed.

Also with respect to the first reinforcing member 122, it is preferable that the curved portions 132 are provided in the end portions 130a and 130b. In a case where an impact load is applied to the exterior panel 100, the shape of the first reinforcing member 122, which has been curved following the outer panel 110, is deformed in the direction of returning to a straight line. At this time, as described with reference to FIG. 12, since the tensile force in the longitudinal direction acts on the vehicle inside of the first reinforcing member 122, in a case where the end portions 130a and 130b of the first reinforcing member 122 are located on the vehicle inside, the end portions 130a and 130b are affected in a direction of coming closer to each other. Therefore, if the curved portions 132 are not provided in the end portions 130a and 130b, there is a possibility that the overlap of the end portions 130a and 130b may occur in the first reinforcing member 122, and if the overlap occurs, there is a case where the cross-sectional shape of the first reinforcing member 122 collapses and the impact load cannot be sufficiently absorbed. That is, it is preferable that also in the first reinforcing member 122, the curved portions 132 are provided in the end portions 130a and 130b. Further, it is preferable that the curved portion 132 of the first reinforcing member 122 is located at the intersection portion or in the vicinity of the intersection portion. This is because it is preferable that an impact load is transmitted from the second reinforcing member 124 to the first reinforcing member 122 at the intersection portion and the cross-sectional shape does not collapse at the position of the intersection portion. Further, the curved portion 132 of the first reinforcing member 122 may be located at the center or in the vicinity of the center in the longitudinal direction of the first reinforcing member 122. This is because when the first reinforcing member 122 is deformed by receiving an impact load, there is a high possibility that the displacement in the vehicle inside direction at the center in the longitudinal direction may become the largest and the cross-sectional shape tends to collapse in the vicinity of the center in the longitudinal direction.

The present invention can be applied to a front door or a rear door of an automobile. Further, the present invention can be applied to not only a door that is disposed at a side portion of an automobile but also a door that is disposed at a rear portion of an automobile. In a case where the present invention is applied to a door (also referred to as a tail gate) that is disposed at a rear portion of an automobile, since the inner panel of such a door is disposed in a direction intersecting the vehicle length direction of the automobile, the vehicle length direction described in the above embodiment may be read as the vehicle width direction, and the vehicle width direction may be read as the vehicle length direction.

Figure 26:
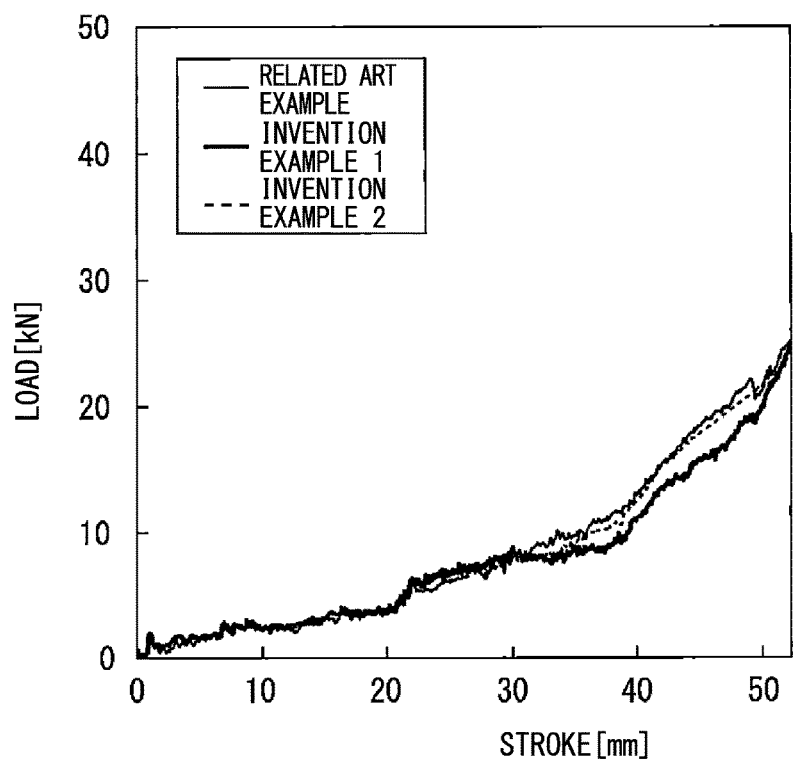
FIG. 26 is a characteristic diagram showing the relationship between a load that is applied to a pole-shaped indenter and a stroke when the indenter is pressed against the exterior panel.

FIG. 26 is a characteristic diagram obtained by simulation of the relationship between a load that is applied to a pole-shaped indenter and a stroke when the indenter is pressed against the exterior panel 100, in a case where the exterior panel 100 shown in FIG. 3 is configured and the structure of the intersection portion is made as in each of the related art example shown in FIG. 9, the configuration in FIGS. 5 to 8 of the present embodiment (Invention Example 1), and the configuration in FIG. 20 of the present embodiment (Invention Example 2). This evaluation assumes a case where a structure such as a utility pole collides with a door panel of a vehicle from the side, and the shape of the indenter is set to be a pole shape assuming a utility pole. The pole-shaped indenter is a circular column having a radius of 150 mm (diameter: 300 mm), and assuming a collision with a utility pole, a load and a stroke in a case where a pole-shaped indenter standing uptight in the vertical direction was pressed between the two first reinforcing members 122 in the center of FIG. 3 were simulated.

As shown in FIG. 26, in any of Invention Example 1 in which the curved portions 132 are not provided in the end portions 130a and 130b of the second reinforcing member 124, and Invention Example 2 in which the curved portions 132 are provided in the end portions 130a and 130b of the second reinforcing member 124, the result almost equivalent to that in the related art example was obtained. Therefore, according to Invention Example 1 and Invention Example 2, the structure of the intersection portion can be made simpler than that in the related art example shown in FIG. 9, and the impact absorption capacity equivalent to that in the related art example can be obtained.

In other words, according to Invention Example 1 and Invention Example 2, even if the structure of the intersection portion having a complicated shape by press forming as in the related art example is not provided, with a simple configuration in which the groove part 122a that is formed by providing an opening in the sheet material 130 is provided only in the first reinforcing member 122 and the second reinforcing member 124 is inserted into the groove part 122a, the impact absorption capacity equivalent to that in the related art example can be obtained. It is considered that one reason is because, although the thickness of the first reinforcing member 122 in the vehicle inside-outside direction is reduced due to providing the groove part 122a, as described above, in a case where an impact load is applied, the second reinforcing member 124 is sandwiched in the groove part 122a, so that a decrease in the strength of the first reinforcing member 122 due to the provision of the groove part 122a does not occur.

Further, as shown in FIG. 26, the result that the impact absorption capacity is higher in Invention Example 2 than in Invention Example 1 was obtained. From this, it can be seen that the curved portions 132 are provided in the end portions 130a and 130b of the sheet material 130 configuring the second reinforcing member 124, so that the second reinforcing member 124 is sandwiched in the groove part 122a without collapse of the cross-sectional shape of the second reinforcing member 124 and an impact load is reliably transmitted to the first reinforcing member 122 and is effectively absorbed. Therefore, according to the present embodiment, in the frame structure of the exterior panel 100 of an automobile in which the first reinforcing member 122 and the second reinforcing member 124 intersect with each other, it is possible to further simplify the structure of the intersection portion to further simplify the manufacturing process, and it is possible to obtain the desired impact absorption capacity.

INDUSTRIAL APPLICABILITY

According to the present invention, it is possible to provide a frame structure of an automotive exterior panel in which it is possible to simplify a manufacturing process and reliably absorb an impact load in a frame structure of an automotive exterior panel in which members configuring a frame intersect with each other.

BRIEF DESCRIPTION OF THE REFERENCE SYMBOLS

100: exterior panel
110: outer panel
120: reinforcing member
122: first reinforcing member
122a: groove part
124: second reinforcing member
130: sheet material
130a, 130b: end portion
132: curved portion

The invention claimed is:

1. A frame structure of an automotive exterior panel comprising:
a sheet-like outer panel;
a plurality of first members, each of which has an elongated shape, and which are disposed on a vehicle inside with respect to the outer panel; and
a second member that has an elongated shape and intersects with the plurality of first members,
wherein each of the plurality of first members extends in a first direction along a sheet surface of the outer panel, and has a groove part recessed from a vehicle outside toward the vehicle inside at a portion thereof in a longitudinal direction,
the second member extends in a second direction along the sheet surface of the outer panel, and has a thickness in a vehicle inside-outside direction, which is uniform at a portion closer to a center than at both end portions in the longitudinal direction,
at an intersection portion where each of the plurality of first members and the second member intersect with each other, the second member is in contact with an inside of the groove part provided in each of the plurality of first members, and
the thickness of the second member in the second direction is uniform at at least one intersection portion.

2. The frame structure of an automotive exterior panel according to claim 1, wherein except for the intersection portion, a thickness of the first member is larger than the thickness of the second member in the vehicle inside-outside direction.

3. The frame structure of an automotive exterior panel according to claim 2, wherein except for the intersection portion, the thickness of the first member is equal to or larger than twice the thickness of the second member in the vehicle inside-outside direction.

4. The frame structure of an automotive exterior panel according to claim 1, wherein the first member is thicker than the second member.

5. The frame structure of an automotive exterior panel according to claim 1, wherein in the vehicle inside-outside direction, a depth of the groove part of the first member is equal to or smaller than ½ of a thickness of the first member in a region adjacent to the groove part outside the groove part.

6. The frame structure of an automotive exterior panel according to claim 1, wherein at the intersection portion, surfaces of the first member and the second member on the vehicle outside in the vehicle inside-outside direction are coplanar.

7. The frame structure of an automotive exterior panel according to claim 1, wherein in a cross section orthogonal to the longitudinal direction of the first member, a thickness in the vehicle inside-outside direction is equal to or larger than a width in a direction along the sheet surface of the outer panel.

8. The frame structure of an automotive exterior panel according to claim 1, wherein in a cross section orthogonal to the longitudinal direction of the second member, a thickness in the vehicle inside-outside direction is equal to or larger than a width in a direction along the sheet surface of the outer panel.

9. The frame structure of an automotive exterior panel according to claim 1, wherein at least one of the first member and the second member has a quadrangular shape in a cross section orthogonal to the longitudinal direction, in at least a portion except for the intersection portion.

10. The frame structure of an automotive exterior panel according to claim 9, wherein the second member has a first surface adjacent to the outer panel and a second surface facing the first surface, and in a cross section orthogonal to the longitudinal direction of the second member, a length of a first side corresponding to the first surface is shorter than a length of a second side corresponding to the second surface.

11. The frame structure of an automotive exterior panel according to claim 1, wherein at least one of the first member and the second member has an annular shape in a cross section orthogonal to the longitudinal direction, in at least a portion except for the intersection portion.

12. The frame structure of an automotive exterior panel according to claim 9, wherein the first member has a hollow structure in which a sheet material is bent, and has a first surface adjacent to the outer panel and a second surface facing the first surface, and on the second surface of the first member, end edges of the bent sheet material are adjacent to each other and face each other.

13. The frame structure of an automotive exterior panel according to claim 12, wherein on the second surface of the first member, the end edges that face each other are curved in different shapes, and an end edge intersection portion in which the curved end edges intersect with each other when viewed from a facing direction in which the end edges face each other is provided.

14. The frame structure of an automotive exterior panel according to claim 9, wherein the second member has a hollow structure in which a sheet material is bent, and has a first surface adjacent to the outer panel and a second surface facing the first surface, and on the first surface or the second surface of the second member, end edges of the bent sheet material are adjacent to each other and face each other.

15. The frame structure of an automotive exterior panel according to claim 14, wherein on the first surface of the second member, the end edges of the bent sheet material are adjacent to each other and face each other.

16. The frame structure of an automotive exterior panel according to claim 15, wherein at the intersection portion or in the vicinity of the intersection portion, on the first surface of the second member, the end edges that face each other are curved in different shapes, and an end edge intersection portion in which the curved end edges intersect with each other when viewed from a facing direction in which the end edges face each other is provided.

17. The frame structure of an automotive exterior panel according to claim 14, wherein at the intersection portion or in the vicinity of the intersection portion, on the first surface or the second surface of the second member, the end edges that face each other are curved in different shapes, and an end edge intersection portion in which the curved end edges intersect with each other when viewed from a facing direction in which the end edges face each other is provided.

18. The frame structure of an automotive exterior panel according to claim 17, wherein on the second surface of the second member, the end edges of the bent sheet material are adjacent to each other and face each other.

19. The frame structure of an automotive exterior panel according to claim 1, wherein the first direction is a vehicle height direction, and the second direction is a vehicle length direction.

20. The frame structure of an automotive exterior panel according to claim 1, wherein the outer panel is an outer panel in a door of an automobile.

21. The frame structure of an automotive exterior panel according to claim 12, wherein the groove part is configured as an opening portion of the sheet material.

22. The frame structure of an automotive exterior panel according to claim 1, wherein the groove part of the first member is a thickness-reduced portion having a thickness reduced with respect to a thickness of a portion, which is not the groove part, of the first member.

23. The frame structure of an automotive exterior panel according to claim 1, wherein the second member is fitted into the groove part at the intersection portion.

24. The frame structure of an automotive exterior panel according to claim 23, wherein at the intersection portion, in a cross section orthogonal to the longitudinal direction of the second member, a cross-sectional shape of the second member is the same shape as a shape of the groove part of the first member.

* * * * *